(12) United States Patent
Arimilli et al.

(10) Patent No.: US 7,502,917 B2
(45) Date of Patent: Mar. 10, 2009

(54) HIGH SPEED MEMORY CLONING FACILITY VIA A LOCKLESS MULTIPROCESSOR MECHANISM

(75) Inventors: Ravi Kumar Arimilli, Austin, TX (US); Benjiman Lee Goodman, Cedar Park, TX (US); Jody Bern Joyner, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1191 days.

(21) Appl. No.: 10/313,277

(22) Filed: Dec. 5, 2002

(65) Prior Publication Data

US 2004/0111547 A1 Jun. 10, 2004

(51) Int. Cl.
*G06F 9/315* (2006.01)
(52) U.S. Cl. ...................... 712/225; 712/244
(58) Field of Classification Search ................ 712/225, 712/244; 711/150, 155, 147, 152
See application file for complete search history.

(56) References Cited

U.S. PATENT DOCUMENTS

| | | | |
|---|---|---|---|
| 4,296,465 A * | 10/1981 | Lemak | 710/316 |
| 5,125,087 A * | 6/1992 | Randell | 712/227 |
| 5,701,501 A * | 12/1997 | Gandhi | 712/203 |
| 5,937,199 A * | 8/1999 | Temple | 710/262 |
| 6,128,714 A | 10/2000 | Onodera | |
| 6,393,540 B1 | 5/2002 | Blumenau et al. | |
| 6,529,968 B1 | 3/2003 | Anderson | |
| 6,665,783 B2 | 12/2003 | Zahir | |
| 6,721,851 B2 | 4/2004 | Ohr | |
| 6,754,802 B1 * | 6/2004 | Kirsch | 712/14 |
| 6,813,522 B1 | 11/2004 | Schwarm et al. | |
| 6,883,076 B1 | 4/2005 | Ohr | |
| 6,895,483 B2 | 5/2005 | Eguchi et al. | |
| 6,938,253 B2 * | 8/2005 | Kim | 718/102 |
| 2003/0153306 A1 | 8/2003 | Study et al. | |

\* cited by examiner

*Primary Examiner*—David J Huisman
(74) *Attorney, Agent, or Firm*—Casimer K. Salys; Dillon & Yudell LLP

(57) ABSTRACT

A processor chip that provides a dynamically selectable operating mode in which particular sequences of instructions are executed without an external interrupt. The processor chip comprises an architected bit that may be set by software and which enables the external interrupt of the processing system to be dynamically enabled/disabled. When a sequence of instructions constituting a data move operation is being issued, the architected bit is toggled to an interrupt disabled state so that execution of the sequence of instructions occurs without an external interrupt. Following the execution of the sequence of instructions, the architected bit is toggled to an interrupt enabled state, which causes instruction execution to be subjected to external interrupts.

15 Claims, 10 Drawing Sheets

HIGH SPEED MEMORY CLONING FACILITY VIA A LOCKLESS MULTIPROCESSOR MECHANISM

CROSS REFERENCE TO RELATED APPLICATIONS

The present application shares specification text and figures with the following co-pending applications, which were filed concurrently with the present application: application Ser. No. 10/313,328 "Data Processing System With Naked Cache Line Write Operations;" application Ser. No. 10/313,323 "High Speed Memory Cloner Within a Data Processing System;" application Ser. No. 10/313,281 "High Speed Memory Cloning Facility Via A Coherently Done Mechanism;" application Ser. No. 10/313,295 "Dynamic Software Accessibility to a Microprocessor System With a High Speed Memory Cloner;" application Ser. No. 10/313,293 "Dynamic Data Routing Mechanism for a High Speed Memory Cloner;" application Ser. No. 10/313,296 "High Speed Memory Cloning Facility Via a Source/Destination Switching Mechanism;" application Ser. No. 10/313,288 "High Speed Cloner With Extended Cache Coherency Protocols and Responses;" and application Ser. No. 10/313,322 "Imprecise Cache Line Protection Mechanism During a Memory Clone Operation." The contents of the co-pending applications are incorporated herein by reference.

BACKGROUND OF THE INVENTION

1. Technical Field

The present invention relates generally to data processing systems and in particular to instruction processing within a data processing system. Still more particularly, the present invention relates to scheduling processor issuance of instructions within a data processing system.

2. Description of the Related Art

The need for faster and less hardware-intensive processing of data and data operations has been the driving force behind the improvements seen in the field of data processing systems. Recent trends have seen the development of faster, smaller, and more complex processors, as well as the implementation of a multiprocessor configuration, which enables multiple interconnected processors to concurrently execute portions of a given task. In addition to the implementation of the multiprocessor configuration, systems were developed with distributed memory systems for more efficient memory access. Also, a switch-based interconnect (or switch) was implemented to replace the traditional bus interconnect.

The distributed memory enabled data to be stored in a plurality of separate memory modules and enhanced memory access in the multiprocessor configuration. The switch-based interconnect enabled the various components of the processing system to connect directly to each other and thus provide faster/more direct communication and data transmission among components.

FIG. 1 is a block diagram illustration of a conventional multiprocessor system with distributed memory and a switch-based interconnect (switch). As shown, multiprocessor data processing system 100 comprises multiple processor chips 101A-101D, which are interconnected to each other and to other system components via switch 103. The other system components included distributed memory 105, 107 (with associated memory controllers 106, 108), and input/output (I/O) components 104. Additional components (not shown) may also be interconnected to the illustrated components via switch 103. Processor chips 101A-101D each comprise two processor cores (processors) labeled sequentially P1-PN. In addition to processors P1-PN, processor chips 101A-101D comprise additional components/logic that together with processors P1-PN control processing operations within data processing system 100. FIG. 1 illustrates one such component, hardware engine 111, the function of which is described below.

In a multiprocessor data processing system as illustrated in FIG. 1, one or more memories/memory modules is typically accessible to multiple processors (or processor operations), and memory is typically shared by the processing resources. Since each of the processing resources may act independently, contention for the shared memory resources may arise within the system. For example, a second processor may attempt to write to (or read from) a particular memory address while the memory address is being accessed by a first processor. If a later request for access occurs while a prior access is in progress, the later request must be delayed or prevented until the prior request is completed. Thus, in order to read or write data from/to a particular memory location (or address), it is necessary for the processor to obtain a lock on that particular memory address until the read/write operation is fully completed. This eliminates the errors that may occur when the system unknowingly processes incorrect (e.g., stale) data.

Additionally, with faster, more complex, multiprocessor systems, multiple data requests may be issued simultaneously and exist in varying stages of completion. Besides coherency concerns, the processors have to ensure that a particular data block is not changed out of sequence of operation. For example, if processor P1 requires data block at address A to be written and processor P2 has to read the same data block, and if the read occurs in program sequence prior to the write, it is important that the order of the two operations be maintained for correct results.

Standard operation of data processing systems requires access to and movement or manipulation of data by the processing (and other) components. The data are typically stored in memory and are accessed/read, retrieved, manipulated, stored/written and/or simply moved using commands issued by the particular processor executing the program code.

A data move operation does not involve changes/modification to the value/content of the data. Rather, a data move operation transfers data from one memory location having a first physical address to another location with a different physical address. In distributed memory systems, data may be moved from one memory module to another memory module, although movement within a single memory/memory module is also possible.

In order to complete either type of move in current systems, the following steps are completed: (1) processor engine issues load and store instructions, which result in cache line ("CL") reads being transmitted from processor chip to memory controller via switch/interconnect; (2) memory controller acquires a lock on destination memory location; (3) processor is assigned lock destination memory location (by memory controller); (4) data are sent to processor chip (engine) from memory (source address) via switch/interconnect; (5) data are sent from processor engine to memory controller of destination location via switch/interconnect; (6) data are written to destination location; and (7) lock of destination is released for other processors. Inherent in this process is a built in latency of transferring the data from the source memory location to the processor chip and then from the processor chip to the destination memory location, even when a switch is being utilized.

Typically, each load and store operation moves an 8-byte data block. To complete this move requires rolling of caches, utilization of translation look-aside buffers (TLBs) to perform effective-to-read address translations, and further requires utilization of the processor and other hardware resources to receive and forward data. At least one processor system manufacturer has introduced hardware-accelerated load lines and store lines along with TLBs to enable a synchronous operation on a cache line at the byte level.

FIG. 1 is now utilized to illustrate the movement of data by processor P1 from one region/location (i.e., physical address) in memory to another. As illustrated in FIG. 1 and the directional arrows identifying paths 1 and 2, during the data move operation, data are moved from address location A in memory 105 by placing the data on a bus (or switch 103) along data path 1 to processor chip 101A. The data are then sent from processor chip 101A to the desired address location B within memory 107 along a data path 2, through switch 103.

To complete the data move operations described above, current (and prior) systems utilized either hardware engines (i.e., a hardware model) and/or software programming models (or interfaces).

In the hardware engine implementation, virtual addresses are utilized, and the hardware engine 111 controls the data move operation and receives the data being moved. The hardware engine 111 (also referred to as a hardware accelerator) initiates a lock acquisition process, which acquires locks on the source and destination memory addresses before commencing movement of the data to avoid multiple processors simultaneously accessing the data at the memory addresses. Instead of sending data up to the processor, the data is sent to the hardware engine 111. The hardware engine 111 makes use of cache line reads and enables the write to be completed in a pipelined manner. The net result is a much quicker move operation.

With software programming models, the software informs the processor hardware of location A and location B, and the processor hardware then completes the move. In this process, real addresses may be utilized (i.e., not virtual addresses). Accordingly, the additional time required for virtual-to-real address translation (or historical pattern matching) required by the above hardware model cab be eliminated. Also in this software model, the addresses may include offsets (e.g., address B may be offset by several bytes).

A typical pseudocode sequence executed by processor P1 to perform this data move operation is as follows:

| | |
|---|---|
| LOCK DST | ; lock destination |
| LOCK SRC | ; lock source |
| LD A (Byte 0) | ; $A_{B0}$ (4B or 8B quantities) |
| ST B (Byte 0) | ; $_{BB0}$ (4B/8B) |
| INC | ; increment byte number |
| CMP | ; compare to see if done |
| BC | ; branch if not done |
| SYNC | ; perform synchronization |
| RL LOCK | ; release locks |

The byte number (B0, B1, B2), etc., is incremented until all the data stored within the memory region identified by address A are moved to the memory region identified by address B. The lock and release operations are carried out by the memory controller and bus arbiters, which assign temporary access and control over the particular address to the requesting processor that is awarded the locks.

Following a data move operation, processor P1 must receive a completion response (or signal) indicating that all the data have been physically moved to memory location B before the processor is able to resume processing other subsequent operations. This ensures that coherency exists among the processing units and the data coherency is maintained. The completion signal is a response to a SYNC operation, which is issued on the fabric by processor P1 after the data move operation to ensure that all processors receive notification of (and acknowledge) the data move operation.

Thus, in FIG. 1, instructions issued by processor P1 initiate the movement of the data from location A to location B. A SYNC is issued by processor P1, and when the last data block has been moved to location B, a signal indicating the physical move has completed is sent to processor P1. In response, processor P1 releases the lock on address B, and processor P1 is able to resume processing other instructions.

Notably, since processor P1 has to acquire the lock on memory location B and then A before the move operation can begin, the completed signal also signals the release of the lock and enables the other processors attempting to access the memory locations A and B to acquire the lock for either address.

Although each of the hardware and software models provides different functional benefits, both possessed several limitations. For example, both hardware and software models have built in latency of loading data from memory (source) up to the processor chip and then from the processor chip back to the memory (destination). Further, with both models, the processor has to wait until the entire move is completed and a completion response from the memory controller is generated before the processor can resume processing subsequent instructions/operations.

The present invention therefore realizes that it would be desirable to provide a method and system for more efficient data move operations. A processor operating state that enables pipelining of known sequences of operations without interrupts would be a welcomed improvement. These and several other benefits are provided by the present invention.

SUMMARY OF THE INVENTION

Disclosed is a multiprocessor system that provides a dynamically selectable operating mode in which particular sequences of instructions are executed without being subjected to an external interrupt. The processor chip comprises an architected bit that enables the system to dynamically switch from an interrupt enabled operating mode that permits interrupts to an interrupt disabled operating mode that prevents external interrupts. When a sequence of instructions constituting a data move operation is being issued, the architected bit is set to a value that disables the external interrupt so that the sequence of instructions is not interrupted. Following the sequence of instructions, the architected bit is set to a value that enables an external interrupt.

In one embodiment, a processing unit is designed with additional logic for monitoring when the processor is issuing a sequence of operations that together constitute a data clone operation. An architected bit is provided that enables the system to dynamically switch from standard operating mode that includes external interrupts to an operating mode with external interrupts while the data clone operation is completing on the fabric.

In one implementation, the sequence of operations are then issued as single ST QUAD operation in lieu of individual operations. Then the architected bit is toggled to an on state indicating a return to normal execution of instructions with external interrupts.

The invention enables multiple processors to each begin a move (or data clone) operation whenever that processor wishes without having to poll the other processors and secure a "lock" prior to issuing the move instructions. One benefit is that multiple processors may issue move instructions concurrently.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein:

DETAILED DESCRIPTION OF AN ILLUSTRATIVE EMBODIMENT

A. Overview

The present invention provides a high speed memory cloner associated with a processor (or processor chip) and an efficient method of completing a data clone operation utilizing features provided by the high speed memory cloner. The memory cloner enables the processor to continue processing operations following a request to move data from a first memory location to another without requiring the actual move of the data to be completed.

The invention introduces an architecturally done state for move operations. The functional features provided by the memory cloner include a naked write operation, advanced coherency operations to support naked writes and direct memory-to-memory data movement, new instructions within the instruction set architecture (e.g., optimized combined instruction set via pipelined issuing of instructions without interrupts), and mode bits for dynamically switching between virtual and real addressing mode for data processing. Additional novel operational features of the data processing system are also provided by the invention.

The invention takes advantage of the switch topology present in current processing systems and the functionality of the memory controller. Unlike current hardware-based or software-based models for carrying out move operations, which require data be sent back to the requesting processor module and then forwarded from the processor module to the destination, the invention implements a combined software model and hardware model with additional features that allow data to be routed directly to the destination. Implementation of the invention is preferably realized utilizing a processor chip designed with a memory cloner that comprises the various hardware and software logic/components described below.

The description of the invention provides several new terms, key among which is the "clone" operation performed by the high speed memory cloner. As utilized herein, the clone operation refers to all operations which take place within the high speed memory cloner, on the fabric, and at the memory locations that together enable the architecturally done state and the actual physical move of data. The data are moved from a point A to a point B, but in a manner that is very different from known methods of completing a data move operation. The references to a data "move" refer specifically to the instructions that are issued from the processor to the high speed memory controller. In some instances, the term "move" is utilized when specifically referring to the physical movement of the data as a part of the data clone operation.

Thus, for example, completion of the physical data move is considered a part of the data clone operation.

B. Hardware Features

Figure 1:
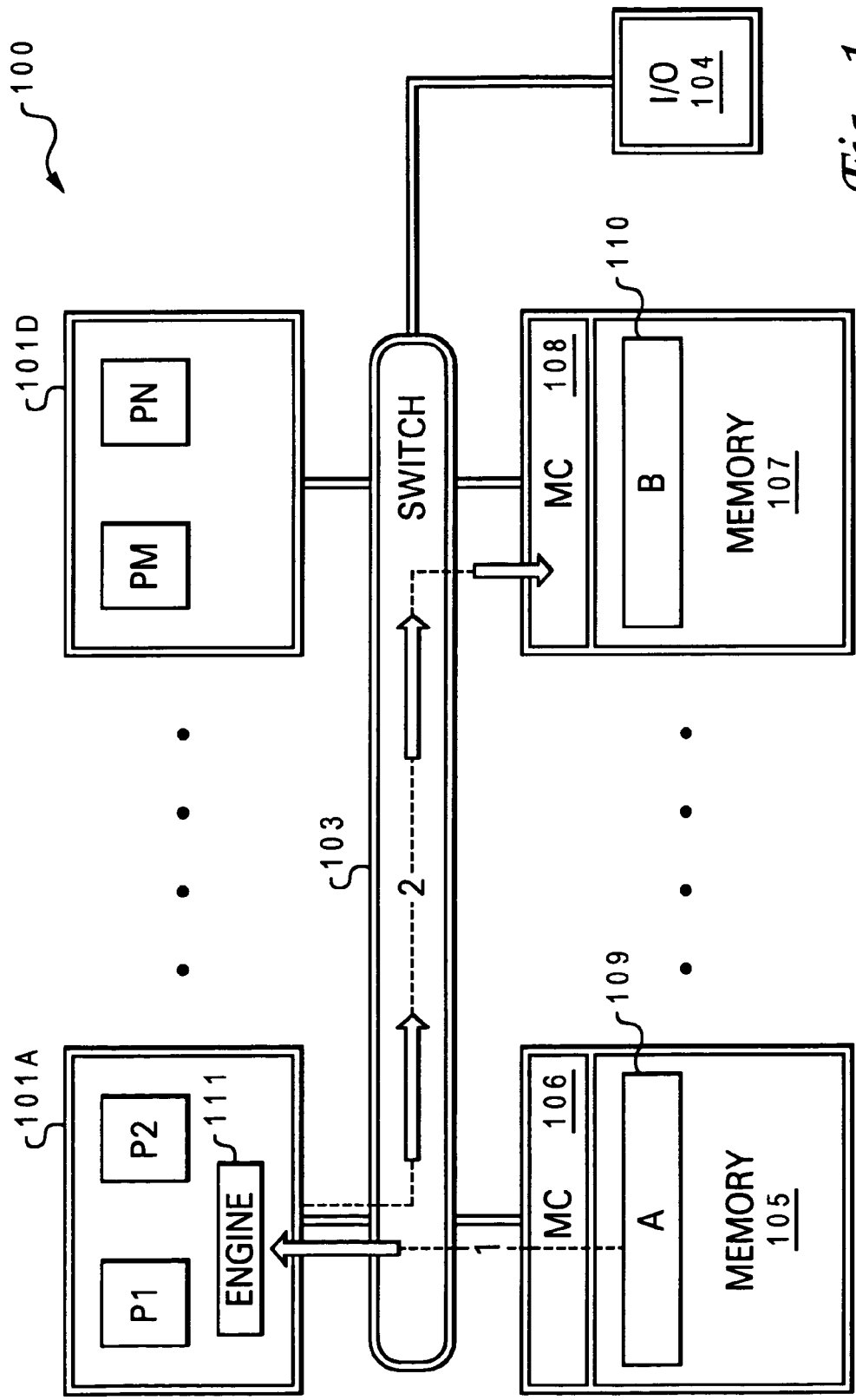
FIG. 1 is a block diagram illustrating a multiprocessor data processing system with a hardware engine utilized to move data according to the prior art.
Figure 2:
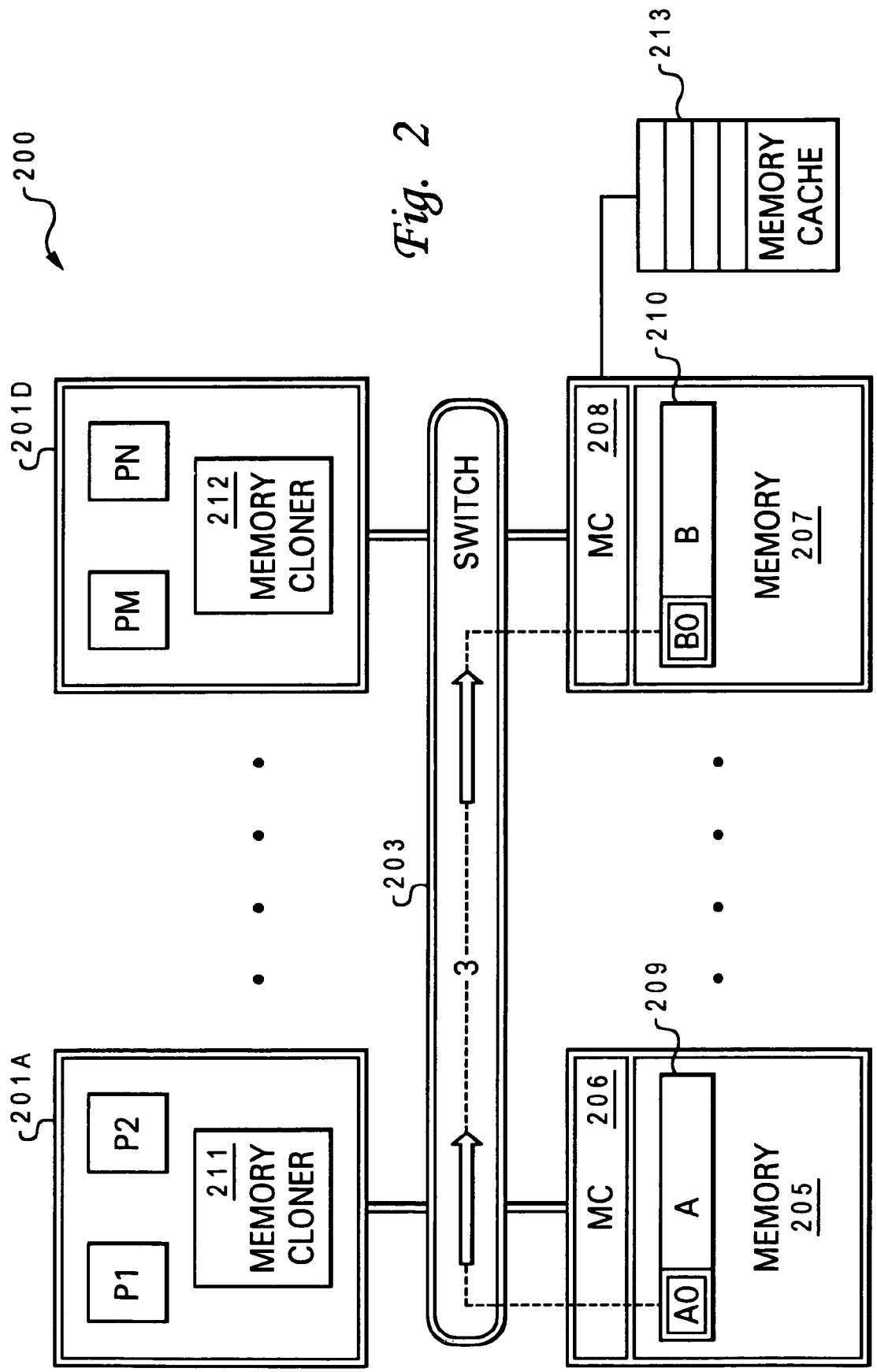
FIG. 2 is a block diagram illustrating an exemplary memory-to-memory clone operation within a processing system configured with a memory cloner according to one embodiment of the present invention.

Turning now to the figures and in particular to FIG. 2, there is illustrated a multiprocessor, switch-connected, data processing system 200, within which the invention may be implemented. Data processing system 200 comprises a plurality of processor modules/chips, two of which, chip 201A and 201D, are depicted. Processor chips 201A and 201D each comprise one or more processors (P1, P2, etc.). Within at least one of the process chips (e.g., processor chip 201 for illustration) is memory cloner 211, which is described below with reference to FIG. 3. Processor chips 201A and 201D are interconnected via switch 203 to each other and to additional components of data processing system 200. These additional components include distributed memory modules, two of which, memory 205 and 207, are depicted, with each having respective memory controller 206 and 208. Associated with memory controller 208 is a memory cache 213, whose functionality is described in conjunction with the description of the naked write operations below.

During implementation of a data clone operation, data is moved directly from memory location A of memory 205 to memory location B of memory 207 via switch 203. Data thus travels along a direct path 3 that does not include the processor or processor module. That is, the data being moved is not first sent to memory cloner 211 or processor P1. The actual movement of data is controlled by memory controllers 206 and 208 respectively (or cache controllers based on a coherent by model described below), which also control access to the memory 205 and 207, respectively, while the physical move is completing.

The illustrated configuration of processors and memory within data processing systems are presented herein for illustrative purposes only. Those skilled in the art understand that various functional features of the invention are fully applicable to a system configuration that comprises a non-distributed memory and/or a single processor/processor chip. The functional features of the invention described herein therefore applies to different configurations of data processing systems so long as the data processing system includes a high speed memory cloner and/or similar component with which the various functional features described herein may be accomplished.

High Speed Memory Cloner

Figure 3:
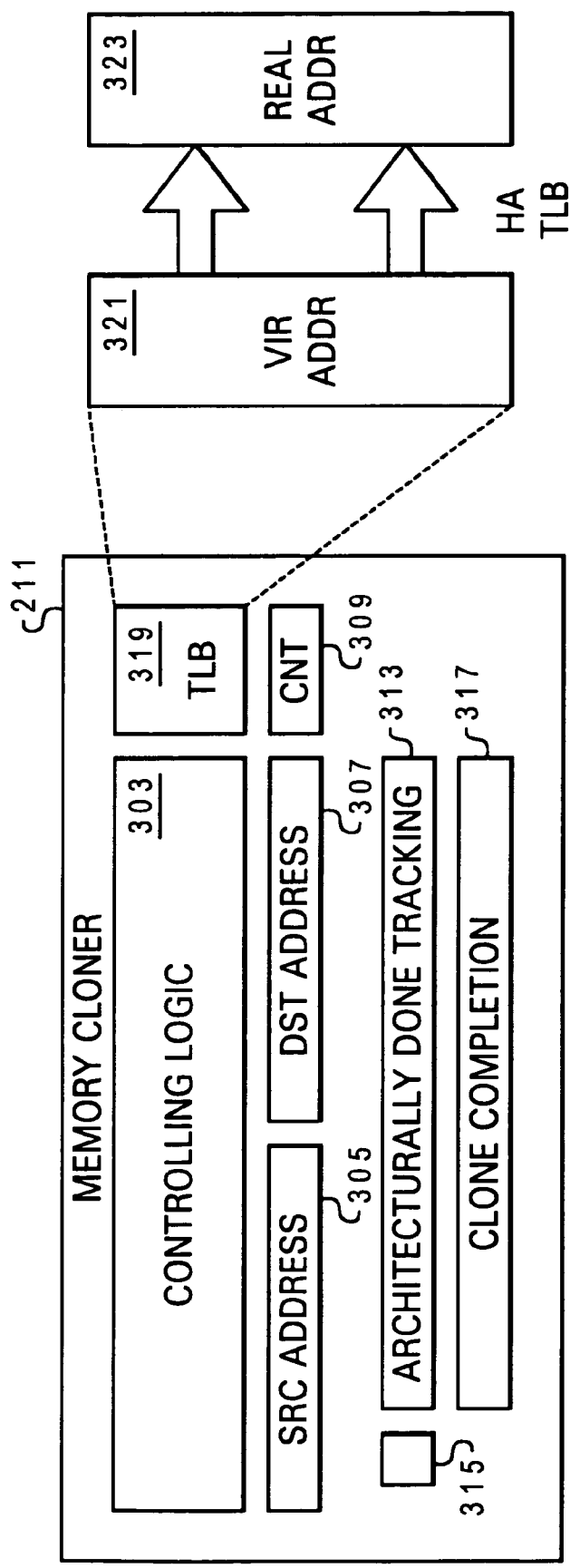
FIG. 3 is a block diagram illustrating components of the memory cloner of FIG. 2 according to one embodiment of the present invention.

Memory cloner 211 comprises hardware and software components by which the processes of the invention are controlled and/or initiated. Specifically, as illustrated in FIG. 3, memory cloner 211 comprises controlling logic 303 and translation look-aside buffer (TLB) 319. Memory cloner 211 also comprises several registers, including SRC address register 305, DST address register 307, CNT register 309, Architecturally DONE register 313, and clone completion register 317. Also included within memory cloner is a mode bit 315. The functionality of each of the illustrated components of memory cloner 211 is described at the relevant sections of the document.

Notably, unlike a hardware accelerator or similar component, memory cloner receives and issues address only operations. The invention may be implemented with a single memory cloner per chip. Alternatively, each microprocessor may have access to a respective memory cloner.

TLB 319 comprises a virtual address buffer 321 and a real address buffer 323. TLB 319, which is separate from the I-TLBs and D-TLBs utilized by processors P1, P2, etc. is fixed and operates in concert with the I-TLB and D-TLB.

Buffers 321 and 323 are loaded by the OS at start-up and preferably store translations for all addresses referenced by the OS and processes so the OS page table in memory does not have to be read.

SRC, DST, and CNT Registers

In the illustrative embodiment of FIG. 3, memory cloner 211 comprises source (SRC) address register 305, destination (DST) address register 307, and count (CNT) register 309. As their names imply, destination address register 307 and source address register 305 store the destination and source addresses, respectively, of the memory location from and to which the data are being moved. Count register 309 stores the number of cache lines being transferred in the data clone operation.

The destination and source addresses are read from locations in memory (X and Y) utilized to store destination and source addresses for data clone operations. Reading of the source and destination addresses is triggered by a processor (e.g., P1) issuing one or more instructions that together causes the memory cloner to initiate a data clone operation as described in detail below.

C. General Processes for Data Clone Operation

Figures 5A, 5B:
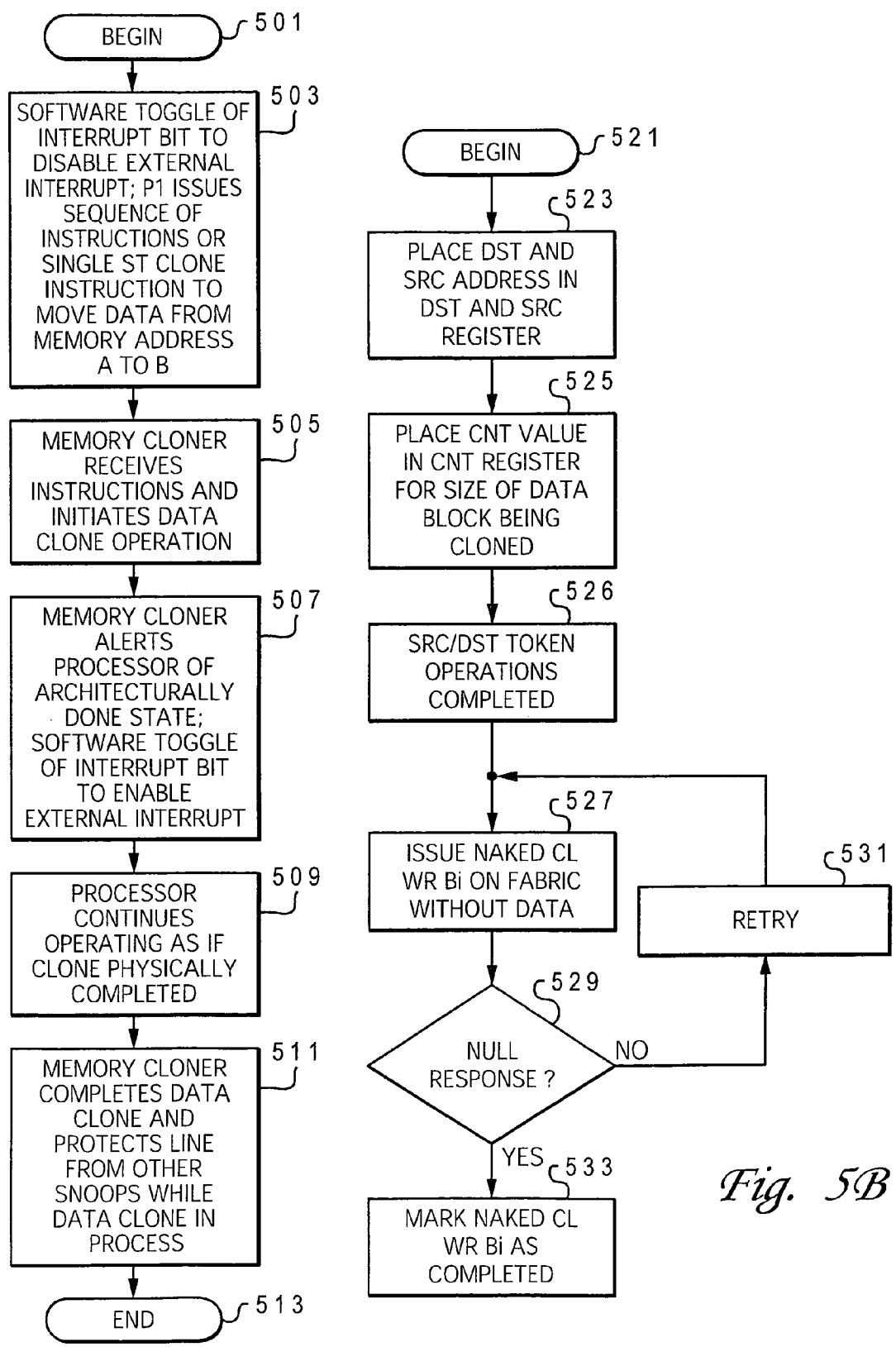
FIG. 5A is a flow chart illustrating the general process of cloning data within a data processing system configured to operate in accordance with an exemplary embodiment of the present invention.
FIG. 5B is a flow chart illustrating the process of issuing naked writes during a data clone operation in accordance with one implementation of the present invention.

FIG. 5A illustrates several of the major steps of overall process completed by the invention utilizing the above described hardware components. The process beings at block 501 and proceeds to block 503 at which the executing software process toggles the interrupt bit to disable the external interrupt. Following the disabling of the external interrupt, processor P1 executes instructions that constitute a request to clone data from memory location A to memory location B as also shown at block 503. The memory cloner receives the data clone request, retrieves the vital source and destination addresses, looks up the corresponding real addresses, and initiates a naked WR operation as indicated at block 505. The naked WR operation is executed on the fabric, and the memory cloner monitors for an architecturally DONE state as illustrated at block 507. The software process then toggles the interrupt bit to enable the external interrupts for subsequent instructions, and following the indication that the clone operation is architecturally DONE, as shown at block 509, the memory cloner signals the processor that the clone operation is completed, and the processor continues processing as if the data move has been physically completed. Then, the memory cloner completes the actual data move in the background as shown at block 511, and the memory cloner performs the necessary protection of the Cache lines while the data is being physically moved. The process then ends as indicated at block 513. The processes provided by the individual blocks of FIG. 5A are expanded and described below with reference to the several other flow charts provided herein.

With reference now to FIG. 5B, there is illustrated several of the steps involved in completing block 505 of FIG. 5A. The process begins at block 521 and then moves to block 523, which illustrates the destination and source addresses for the requested data clone operation being retrieved from memory locations X and Y and placed in the respective registers in the memory cloner. The count value (i.e., number of cache lines of data) is also placed in the CNT register as shown at block 525. The source and destination token operations are then completed as shown at block 526. Following, naked CL WRs are placed on the fabric as shown at block 527. Each naked CL WR receives a response on the fabric from the memory controller. A determination is made at block 529 whether response is a NULL. If the response is not a NULL, the naked CL WR operation is retried as shown at block 531. When the response is a NULL, however, the naked CL WR is marked as completed within memory cloner 211, as shown at block 533. The various steps illustrated in FIG. 5B are described in greater details in the sections below.

Move Operands and Retrieval of Move Addresses

To enable a clear understanding of the invention, implementation of a data clone operation will be described with reference to small blocks of program code and to cloning of data from a memory location A (with virtual address A and 0real address A1) to another memory location B (with virtual address B and real address B1). Thus, for example, a sample block of program code executed at processor P1 that results in the cloning of data from memory location A to memory location B is as follows:

| ST | X | (address X holds virtual source address A) |
|----|---|---|
| ST | Y | (address Y holds virtual destination address B) |
| ST | CNT | (CNT is the number of data lines to clone) |
| SYNC | | |
| ADD | | |

The above represents sample instructions received by the memory cloner from the processor to initiate a clone operation. The ADD instruction is utilized as the example instruction that is not executed by the processor until completion of the data clone operation. The memory cloner initiates a data clone operation whenever the above sequence of instructions up to the SYNC is received from the processor. The execution of the above sequence of instructions at the memory cloner results in the return of the virtual source and destination addresses to the memory cloner and also provides the number of lines of data to be moved. In the illustrative embodiment the value of CNT is equal to the number of lines within a page of memory, and the clone operation is described as cloning a single page of data located at address A1.

Figure 4A:
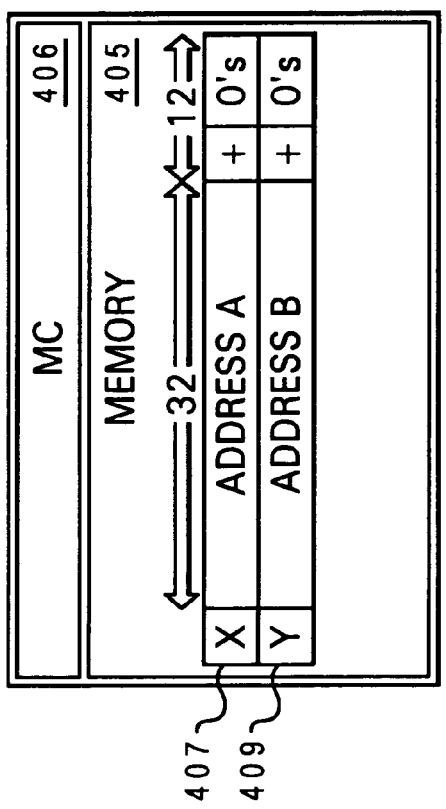
FIG. 4A is a block diagram representation of memory locations X and Y within main memory, which are utilized to store the source and destination addresses for a memory clone operation according to one embodiment of the present invention.

FIG. 4A illustrates memory 405, which can be any memory 205, 207 within the memory subsystem, with block representation of the X and Y memory locations within which the source and destination addresses, A and B, for the data clone operation reside. In one embodiment, the A and B addresses for the clone operation are stored within X and Y memory locations by the processor at an earlier execution time. Each location comprises 32 bits of address data followed by 12 reserved bits. According to the illustrated embodiment, the first 5 of these additional 12 bits are utilized by a state machine of the data processing system to select which one of the 32 possible pages within the source or destination page address ranges are being requested/accessed.

As shown in FIG. 4A, the X and Y addresses are memory locations that store the A and B virtual addresses, and when included in a store request (ST), indicates to the processor and the memory cloner) that the request is for a data clone operation (and not a conventional store operation). The virtual addresses A and B correspond to real memory addresses A1 and B1 of the source and destination of the data clone operation and are stored within SRC address register 305 and DST address register 307 of memory cloner 211. As utilized within the below description of the memory clone operation, A and B refer to the addresses, which are the data addresses stored within the memory cloner, while A1 and B1 refer to the real memory addresses issued to the fabric (i.e., out on the switch). Both A and A1 and B and B1 respectively represent the source memory location and destination memory location of the data clone operation.

In the illustrative embodiment, when memory cloner 211 receives the processor and sequence of ST commands followed by a SYNC, TLB 319 looks up the real addresses X1 and Y1, from the virtual addresses (X and Y) respectively. X1 and Y1 are memory locations dedicated to storage of the source and destination addresses for a memory clone operation. Memory cloner 211 issues the operations out to the memory via switch (i.e., on the fabric), and the operations access the respective locations and return the destination and source addresses to memory cloner 211.

Memory cloner 211 receives the virtual addresses for source (A) and destination (B) from locations X1 and Y1, respectively. The actual addresses provided are the first page memory addresses.

The memory cloner 211 stores the source and destination addresses and the cache line count received from processor P1 in registers 305, 307, 309, respectively.

Based on the value stored within the CNT register 309, the memory cloner is able to 10 generate the sequential addresses beginning with the addresses within the SRC register 305 and DST register 307 utilizing the first 5 appended bits of the 12 reserved bits, numbered sequentially from 0 to 31.

For example, with a clone operation in which a 4 Kbyte page of data with 128-byte lines is being moved from memory address A1 (with 4K aligned addresses) to memory address B1 (also having 4K aligned addresses), a count value of 32 is stored in CNT register 309 corresponding to the state machine address extensions 00000 through 11111, which are appended to the source address in the first five bits. These address extensions are settable by the state machine (i.e., a counter utilized by the memory cloner) and identify which address blocks within the page are being moved.

Also, an additional feature of the invention enables cloning of partial memory pages in addition to entire pages. This feature is relevant for embodiments in which the move operation occurs between memory components with different size cache lines, for example.

In response to receipt of the virtual source and destination addresses, the memory cloner 211 performs the functions of (1) storing the source address (i.e., address A) in SRC register 305 and (2) storing the destination address (i.e., address B) in the DST register 307. The memory cloner 211 also stores the CNT value received from the processor in CNT register 309. The source and destination addresses stored are virtual addresses generated by the processor during prior processing. These addresses may then be looked up by TLB 319 to determine the corresponding real addresses in memory, which addresses are then used to carry out the data clone operation described below.

D. Token Operations

Returning now to block 526, before commencing the write and read operations for a memory clone, the memory cloner issues a set of tokens (or address tenures) referred to as the source (SRC) token and destination (DST) token, in the illustrative embodiment. The SRC token is an operation on the fabric, which queries the system to see if any other memory cloner is currently utilizing the SRC page address. Similarly, the DST token is an operation on the fabric, which queries the system to see if any other memory cloner is currently utilizing the DST page address.

The SRC and DST tokens are issued by the memory cloner on the fabric prior to issuing the operations that initiate the clone operation. The tokens of each memory cloner are snooped by all other memory cloners (or processors) in the system. Each snooper checks the source and destination addresses of the tokens against any address currently being utilized by that snooper, and each snooper then sends out a reply that indicates to the memory cloner that issued the tokens whether the addresses are being utilized by one of the snoopers. The token operation ensures that no two memory cloners are attempting to read/write to the same location. The token operation also ensures that the memory address space is available for the data clone operation.

The use of tokens prevents multiple memory cloners from concurrently writing data to the same memory location. In addition to preventing multiple, simultaneous updates to a memory location by different operations, the token operations also help avoid livelocks, as well as ensure that coherency within the memory is maintained. The invention also provides additional methods to ensure that processors do not livelock, as discussed below.

Utilizing the token address operands enables the memory cloner to receive a clear signal with respect to the source and destination addresses before commencing the series of write operations. Once the memory cloner receives the clear signal from the tokens, the memory cloner is able to begin the clone operation by issuing naked cache line (CL) write (WR) operations and then CL read (RD) operations.

Token operations are then generated from the received source and destination addresses, and the tokens operations are issued to secure a clear response to access the respective memory locations. The SRC and DST token operations are issued on the fabric to determine if the requested memory locations are available to the cloner (i.e., not being currently utilized by another processor or memory cloner, etc.) and to reserve the available addresses until the clone operation is completed. Once the DST token and the SRC token operations return with a clear, the memory cloner begins protecting the corresponding address spaces by snooping other requests for access to those address spaces as described below.

Notably, in one embodiment, a clone operation is allowed to begin once the response from the DST token indicates that the destination address is clear for the clone operation (even without receiving a clear from the SRC token). This embodiment enables data to be simultaneously sourced from the same source address and thus allows multiple, concurrent clone operations with the same source address. One primary reason for this implementation is that unlike traditional move operations, the clone operation controlled by the memory cloner begins with a series of naked write operations to the destination address, as will be described in detail below.

An example of the possible data sourcing operations that are capable based on the utilization of tokens is now provided. In this example, "A" is utilized to represent the source address from which data is being sourced. "B" represents the address of the destination to which the memory clone is being completed, and "O" represents a memory address for another process (e.g., a clone operation) that may be attempting to access location A or B corresponding to address A or B, respectively. When data is being sourced from A to B, data may also concurrently be sourced from A to O. However, no other combinations are possible while a data clone is occurring. Among these other combinations are: A to B and O to B; A to B and B to O; and A to B and O to A. Note, in each combination, S is assumed to be the address from which the data is sourced. Thus, the invention permits multiple memory moves to be sourced from the same memory location. However, when the destination address is the same as the snooped source address, the snooper issues a retry to a conflicting SRC token and DST token, depending on which was first received.

E. Naked Write Operations

Naked Writes

Referring now to block 527 of FIG. 5B, The invention introduces a new write operation and associated set of responses within the memory cloner. This operation is a cache line write with no data tenure (also referred to as a naked write because the operation is an address-only operation that does not include a data tenure (hence the term "naked"). The naked write is issued by the memory cloner to begin a data clone operation and is received by the memory controller of the memory containing the destination memory location to which the data are to be moved. The memory controller generates a response to the naked write, and the response is sent back to the memory cloner.

The memory cloner thus issues write commands with no data (interchangeably referred to as naked writes), which are placed on the fabric and which initiate the allocation of the destination buffers, etc., for the data being moved. The memory cloner issues 32 naked CL writes beginning with the first destination addresses, corresponding to address B, plus each of the 31 other sequential page-level address extensions. The pipelining of naked writes and the associated responses, etc., are illustrated by FIG. 4B.

The memory cloner issues the CL WR in a sequential, pipelined manner. The pipelining process provides DMA CL WR ($B_0$-$B_{31}$) since the data is written directly to memory. The 32 CL WR operations are independent and overlap on the fabric.

Response to Naked CL Write

Figure 4B:
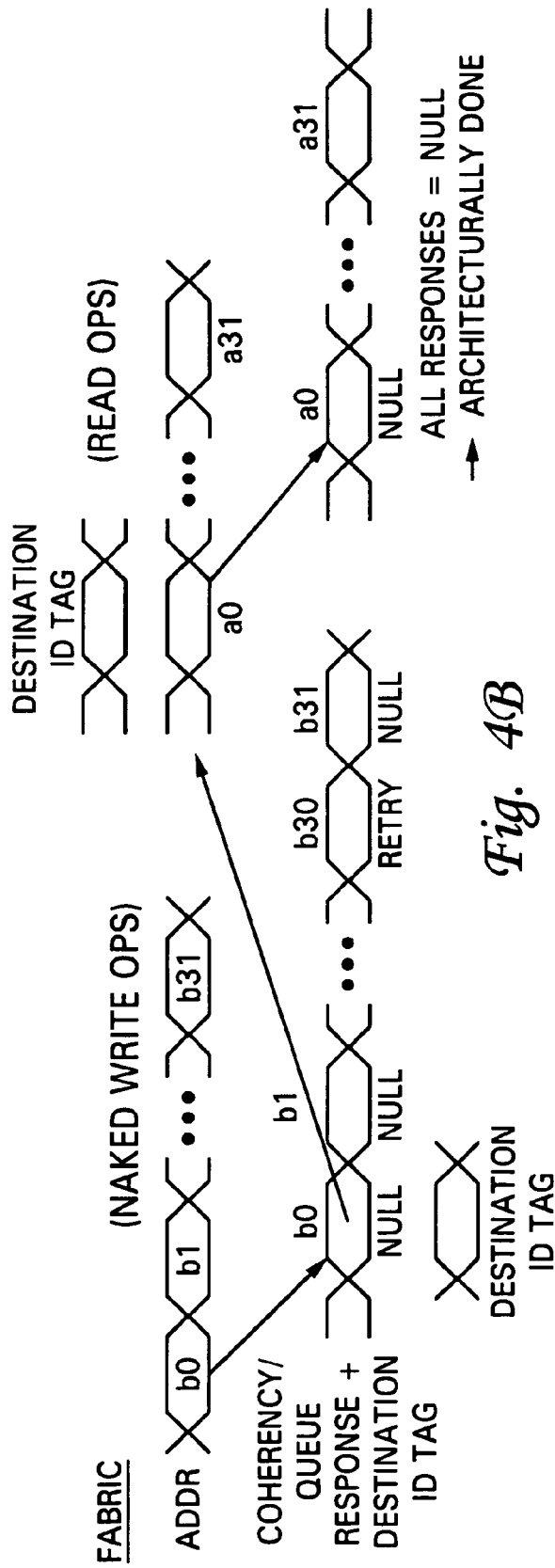
FIG. 4B illustrates the flow of memory address operands and tags, including naked writes, on the (switch) fabric of the data processing system of FIG. 2 according to one embodiment of the present invention.

FIG. 4B illustrates cache line (CL) read (RD) and write (WR) operations and simulated line segments of a corresponding page (i.e., $A_0$-$A_{31}$ and $B_0$-$B_{31}$) being transmitted on the fabric. Each operation receives a coherency response described below. As illustrated, the naked CL writes are issued without any actual data being transmitted. Once the naked CL WRs are issued, a coherency response is generated for each naked write indicating whether the memory location B is free to accept the data being moved. The response may be either a Null or Retry depending on whether or not the memory controller of the particular destination memory location is able to allocate a buffer to receive the data being moved.

In the illustrative embodiment, the buffer represents a cache line of memory cache 213 of destination memory 207. During standard memory operation, data that is sent to the memory is first stored within memory cache 213 and then the data is later moved into the physical memory 207. Thus, memory controller checks a particular cache line that is utilized to store data for the memory address of the particular naked CL WR operation. The term buffer is utilized somewhat interchangeably with cache line, although the invention may also be implemented without a formal memory cache structure that may constitute the buffer.

The coherency response is sent back to the memory cloner. The response provides an indication to the memory cloner whether the data transfer can commence at that time (subject to coherency checks and availability of the source address). When the memory controller is able to allocate the buffer for the naked CL WR, the buffer is allocated and the memory controller waits for the receipt of data for that CL. In addition to the Null/Retry Response, a destination ID tag is also provided for each naked CLWR as shown in FIG. 4B. Utilization of the destination ID is described with reference to the CLR operations described with reference to FIG. 5D.

F. Architecturally Done State

Figure 5C:
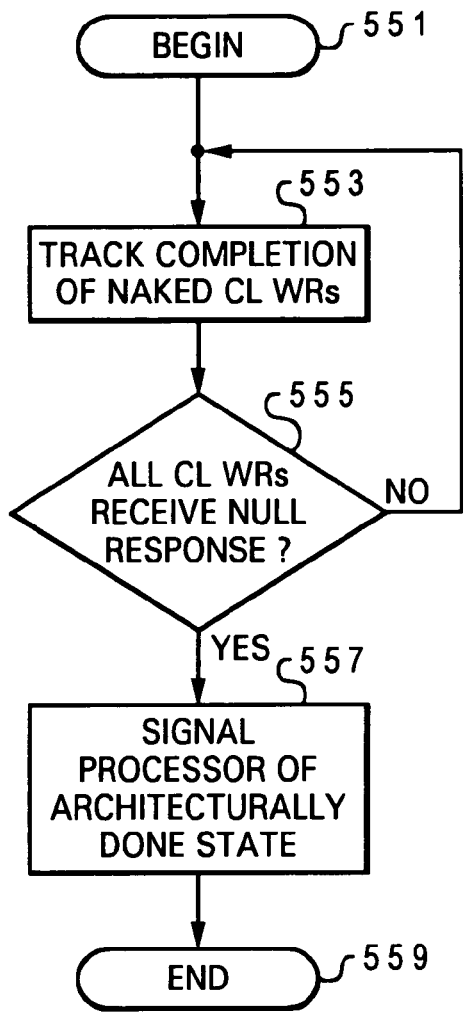
FIG. 5C is a flow chart illustrating process steps leading to and subsequent to an architecturally done state according to one embodiment of the present invention.

FIG. 5C illustrates the process by which an architecturally DONE state occurs and the response by the processor to the architecturally DONE state. The process begins as shown at block 551 and the memory cloner monitors for Null responses to the issued naked CL WR operations as indicated at block 553. A determination is made at block 553 whether all of the issued naked CL Wrs have received a Null response from the memory controller. When the memory controller has issued a NULL response to all of the naked CL WR operations, the entire move is considered "architecturally DONE," as shown at block 557 and the memory cloner signals the requesting processor that the data clone operation has completed even though the data to be moved have not even been read from the memory subsystem. The process then ends at block 559. The processor resumes executing the subsequent instructions (e.g., ADD instruction following the SYNC in the example instruction sequence).

The implementation of the architecturally DONE state is made possible because the data are not received by the processor or memory cloner. That is, the data to be moved need not be transmitted to the processor chip or the memory cloner, but are instead transferred directly from memory location A to memory location B. The processor receives an indication that the clone operation has been architecturally DONE once the system will no longer provide "old" destination data to the processor.

Thus, from the processor's perspective, the clone operation may appear to be complete even before any line of data is physically moved (depending on how quickly the physical move can be completed based on available bandwidth, size of data segments, number of overlapping moves, and other processes traversing the switch, etc.). When the architecturally DONE state is achieved, all the destination address buffers have been allocated to receive data and the memory cloner has issued the corresponding read operations triggering the movement of the data to the destination address. From a system synchronization perspective, although not all of the data has began moving or completed moving, the processor is informed that the clone operation is completed and processor assumes that the processor-issued SYNC operation has received an ACK response, which indicates completion of the clone operation.

One benefit of the implementation of the architecturally done state is that the processor is made immune to memory latencies and system topologies since it does not have to wait until the actual data clone operation completes. Thus, processor resources allocated to the data clone operation and which are prevented from processing subsequent instructions until receipt of the ACK response are quickly released to continue processing other operations with minimal delay after the data clone instructions are sent to the memory cloner.

Register-Based Tracking of Architecturally Done State

In one embodiment, a software or hardware register-based tracking of the Null responses received is implemented. The register is provided within memory clone 211 as illustrated in FIG. 2. With a CNT value of 32, for example, the memory cloner 211 is provided a 32-bit software register 313 to track which ones of the 32 naked CL writes have received a Null response. FIG. 7B illustrates a 32-bit register 313 that is utilized to provide an indication to the memory cloner that the clone operation is at least partially done or architecturally done. The register serves as a progress bar that is monitored by the memory cloner. Instead of implementing a SYNC operation, the memory cloner utilizes 313 to monitor/record which Null responses have been received. Each bit is set to "1" once a Null response is received for the correspondingly numbered naked CL write operation. According to the illustrated embodiment, naked CL write operations for destination memory addresses associated with bits 1, 2, and 4 have completed, as evidenced by the "1" placed in the corresponding bit locations of register 313.

In the illustrative embodiment, the determination of the architecturally DONE state is completed by scanning the bits of the register to see if all of the bits are set (1) (or if any are not set). Another implementation involves ORing the values held in each bit of the register. In this embodiment, the memory cloner signals the processor of the DONE state after ORing all the Null responses for the naked writes. When all bit values are 1, the architecturally DONE state is confirmed and an indication is sent to the requesting processor by the memory cloner. Then, the entire register 313 is reset to 0.

In the illustrated embodiment, an N-bit register is utilized to track which of the naked writes received a Null response, where N is a design parameter that is large enough to cover the maximum number of writes issued for a clone operation. However, in some cases, the processor is only interested in knowing whether particular cache lines are architecturally DONE. For these cases, only the particular register location associated with those cache lines of interest are read or checked, and memory cloner signals the processor to resume operation once these particular cache lines are architecturally DONE.

G. Direct Memory-To-Memory Move Via Destination ID Tag Read Requests

Figure 5D:
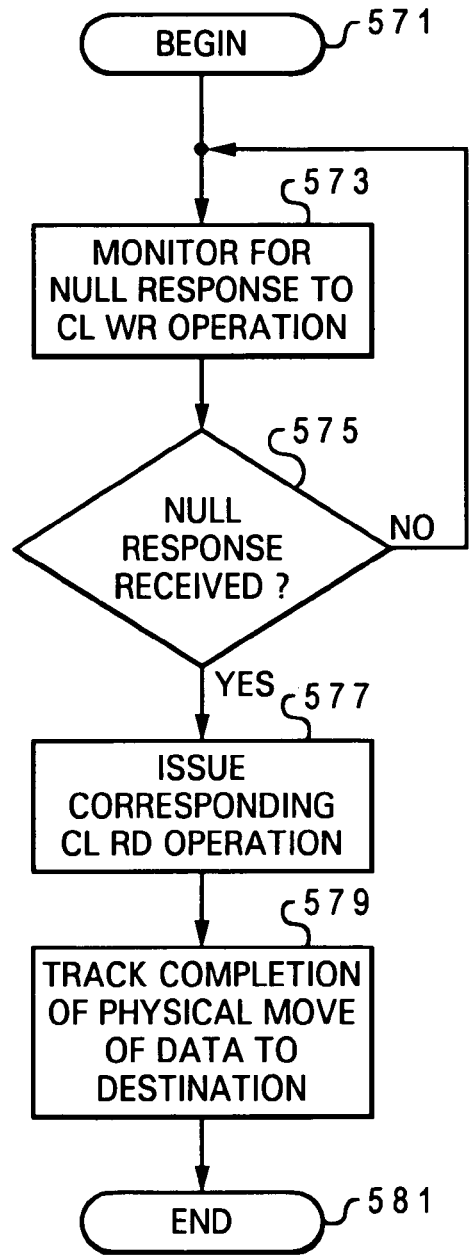
FIG. 5D is a flow chart illustrating the process of issuing read operations physically moving data by issuing read operations in accordance with one embodiment of the invention.

Returning now to FIG. 4B, and with reference to the flow chart of FIG. 5D, the process of issuing read operations subsequent to the naked Write operations is illustrated. The process begins at block 571 and the memory cloner monitors for a NULL response to a naked CL WR as shown at block 573. A determination is made at block 575 whether a Null response was received. The memory cloner retries all naked CL WRs that do not receive a Null response until a Null response is received for each naked CL WR. As shown at block 577, when a Null response is received at the memory cloner, a corresponding (address) CL read operation is immediately issued on the fabric to the source memory location in which the data segment to be moved currently resides. For example, a Null response received for naked CL WR($B_0$) results in placement of CL RD($A_0$) on the fabric and so on as illustrated in FIG. 4B. The memory controller for the source memory location checks the availability of the particular address within the source memory to source data being requested by the CL read operation (i.e., whether the address location or data are not being currently utilized by another process). This check results in a Null response (or a Retry).

In one embodiment, when the source of the data being cloned is not available to the CL RD operation, the CL RD operation is queued until the source becomes available. Accordingly, retries are not required. However, for embodiments that provide retries rather than queuing of CL RD operations, the memory cloner is signaled to retry the specific CL RD operation.

Destination ID Tag on Fabric

As illustrated in FIG. 4B, a destination ID tag is issued by the memory controller of the destination memory along with the Null response to the naked CL WR. The generated destination ID tag may then be appended to or inserted within the CL RD operation (rather than, or in addition to, the ID of the processor). According to the illustrated embodiment, the destination ID tag is placed on the fabric with the respective CL RD request. The destination ID tag is the routing tag that is provided to a CL RD request to identify the location to which the data requested by the read operation is to be returned. Specifically, the destination ID tag identifies the memory buffer (allocated to the naked CL WR operation) to receive the data being moved by the associated CL RD operation.

Figure 7A:
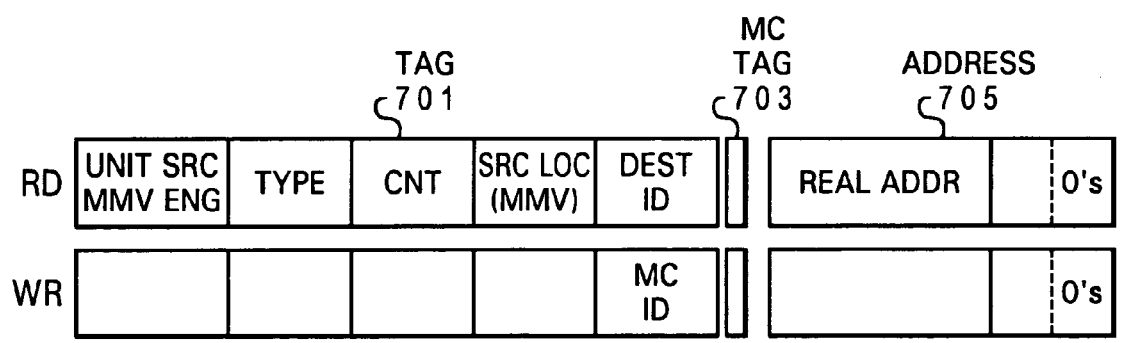
FIG. 7A is a block illustration of an address tag that is utilized to direct multiple concurrent data clone operations to a correct destination memory according to one embodiment of the present invention.
Figure 7B:
FIG. 7B is a block illustration of a register utilized by the memory cloner to track when naked writes are completed and the architecturally done state occurs according to one embodiment of the present invention.

FIG. 7A illustrates read and write address operations 705 along with destination ID tags 701 (including memory cloner tags 703), which are sent on the fabric. The two is utilized to distinguish multiple clone operations overlapping on the fabric. As shown in FIG. 7A, address operations 705 comprises 32 bit source (SRC) or destination (DST) page-level address and the additional 12 reserve bits, which include the 5 bits being utilized by the controlling logic 303 of memory cloner 211 to provide the page level addressing.

Associated with address operation 705 is the destination ID tag 701, which comprises the ID of the memory cloner that issued the operation), the type of operation (i.e., WR, RD, Token (SRC) or Token (DST)), the count value (CNT), and the ID of the destination unit to send the response/data of the operation. As illustrated, the Write operations are initially sent out with the memory cloner address in the ID field as illustrated in the WR tag of FIG. 7A. The SRC address is replaced in the RD operation with the actual destination memory address as shown in the RD tag of FIG. 7A.

Direct Source-to-Destination Move

In order to complete a direct memory-to-memory data move, rather than a move that is routed through the requesting processor (or memory cloner), the memory cloner replaces the physical processor ID in the tag of the CL RD operation with the real memory address of the destination memory location (B) (i.e., the destination ID). This enables data to be sent directly to the memory location B (rather than having to be routed through the memory cloner) as explained below.

In current systems, the ID of the processor or processor chip that issues a read request is included within the read request or provided as a tag to the read request to identify the component to which the data are to be returned. That is, the ID references the source of the read operation and not the final destination to which the data will be moved.

The memory controllers automatically routes data to the location provided within the destination tag. Thus, with current systems, the data are sent to the processor. According to the embodiment described herein, however, since the routing address is that of the final (memory) destination, the source memory controller necessarily routes the data directly to the destination memory. Data is transferred from source memory directly to destination memory via the switch. The data is never sent through the processor or memory cloner, removing data routing operations from the processor. Notably, in the embodiment where the data is being moved within the same physical memory block, the data clone may be completed without data being sent out to the external switch fabric.

Tracking Completion of Data Clone Operation

In one embodiment, in order for the memory cloner to know when the clone operation is completed, a software-enabled clone completion register is provided that tracks which cache lines (or how many of the data portions) have completed the clone operation. Because of the indeterminate time between when the addresses are issued and when the data makes its way to the destination through the switch, the load completion register is utilized as a counter that counts the number of data portions $A_0 \ldots A_n$ that have been received at memory location $B_0 \ldots B_n$. In one embodiment, the memory cloner tracks the completion of the actual move based on when all the read address operations receive Null responses indicating that all the data are in flight on the fabric to the destination memory location.

In an alternate embodiment in which a software register is utilized, the register comprises an equivalent number of bits as the CNT value. Each bit thus corresponds to a specific segment (or CL granule) of the page of data being moved. The clone completion register may be a component part of memory cloner as shown in FIG. 3, and clone completion register 317 is utilized to track the progress of the clone operation until all the data of the clone operation has been cloned to the destination memory location.

H. Coherency Protocol and Operations

Figure 6A:
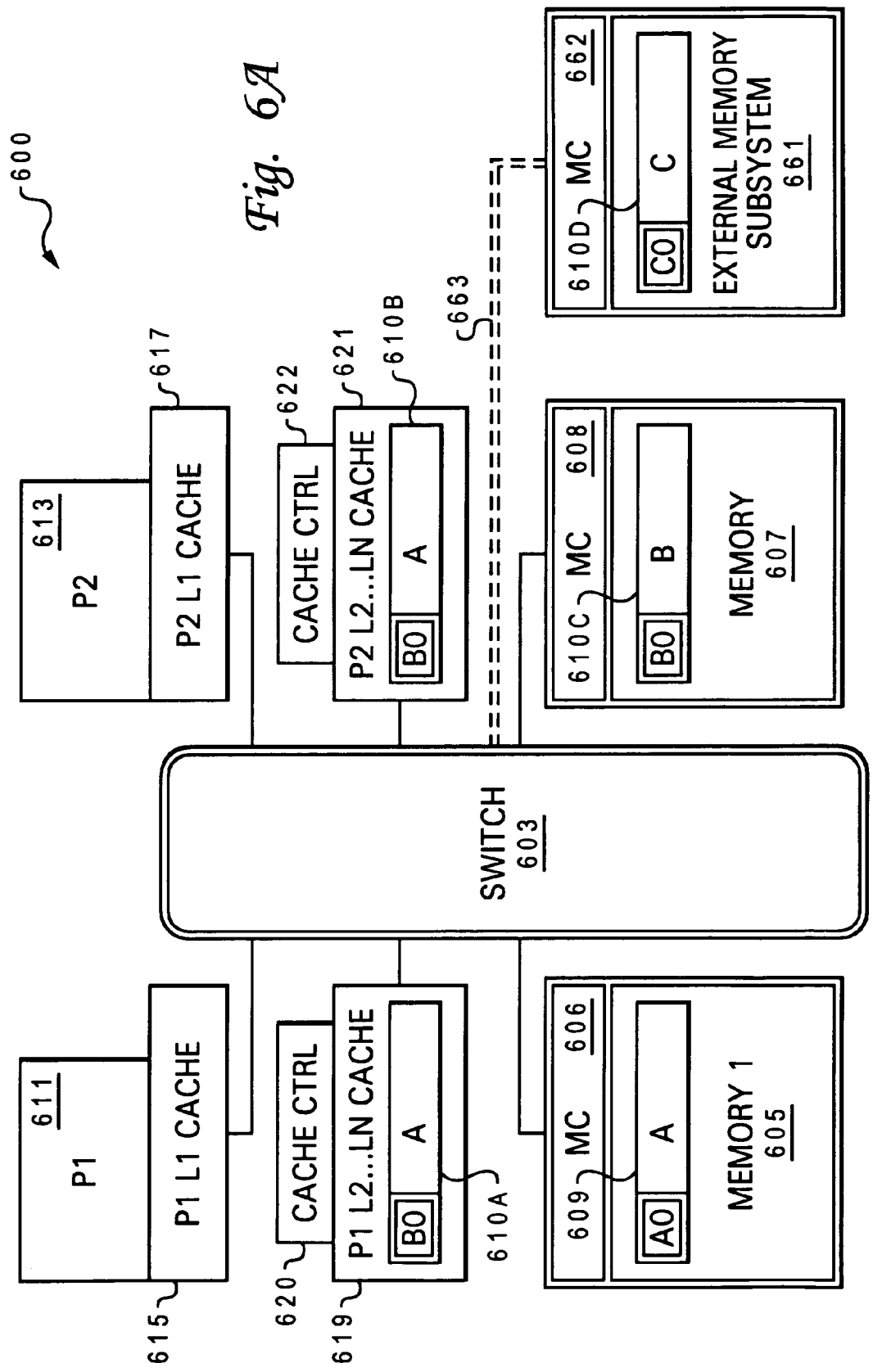
FIG. 6A illustrates a distributed memory subsystem with main memory, several levels of caches, and external system memory according to one model for coherently sourcing/storing data during implementation of the present invention.
Figure 6B:
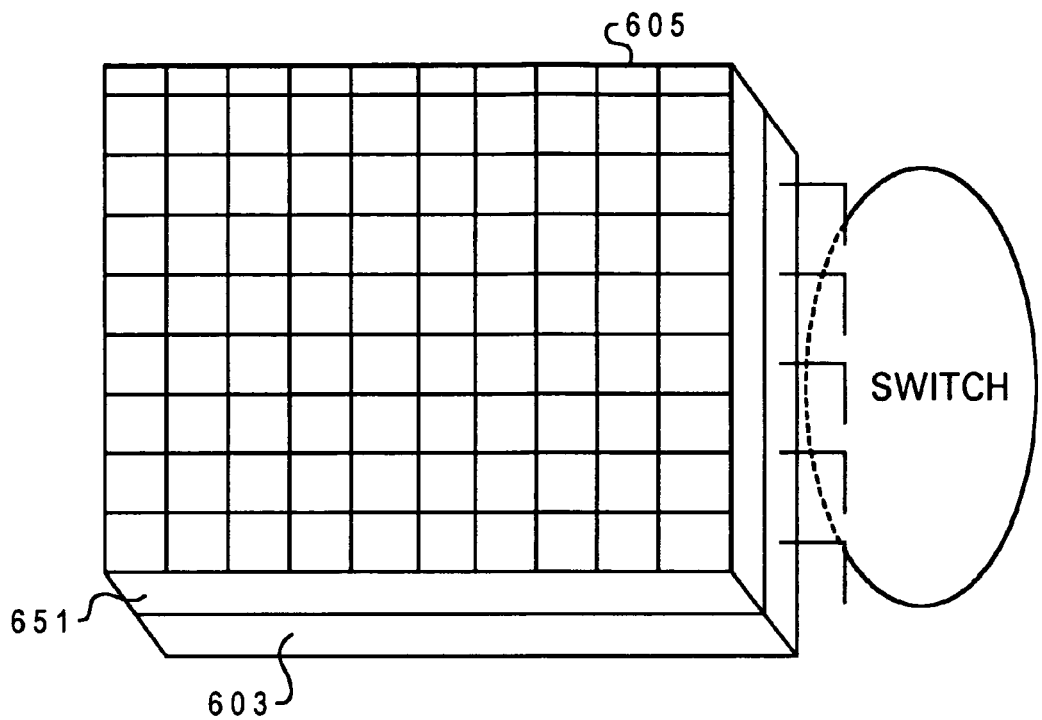
FIG. 6B illustrates a memory module with upper layer metals, which facilitate the direct cloning of data from a source to a destination within the same memory module without utilization of the external switch.

One important consideration when completing a data clone operation is that the data has to be sourced from the memory location or cache that contains the most coherent copy of the data. Thus, although the invention is described as sourcing data directly from memory, the actual application of the invention permits the data be sourced from any coherent location of the cache/memory subsystem. One possible configuration of the memory subsystem is illustrated by FIG. 6B.

Switch 603 is illustrated in the background linking the components of system 600, which includes processors 611, 613 and various components of the memory subsystem. As illustrated herein, the memory subsystem refers to the distributed main memory 605, 607, processor (L1) caches 615, 617, lower level (L2-LN) caches 619, 621, which may also be intervening caches, and any similar source. Any one of these memory components may contain the most coherent copy of the data at the time the data are to be moved. Notably, as illustrated in FIG. 2, and described above, memory controller 608 comprises memory cache 213 (also referred to as herein as a buffer) into which the cloned data is moved. Because data that is sent to the memory is first stored within memory cache 213 and then later moved to actual physical memory 607, it is not uncommon for memory cache 213 to contain the most coherent copy of data (i.e., data in the M state) for the destination address.

In some advanced systems, data are shared among different systems connected via an external (fabric) bus 663. As shown herein, external memory subsystem 661 contains a memory location associated with memory address C. The data within this storage location may represent the most coherent copy of the source data of the data clone operation. Connection to external memory subsystem 661 may be via a Local Area Network (LAN) or even a Wide Area Network (WAN).

A conventional coherency protocol (e.g., Modified (M), Exclusive (E), Shared (S), Invalid (I) or MESI protocol with regard to sourcing of coherent data may be employed; however, the coherency protocol utilized herein extends the conventional protocol to allow the memory cloner to obtain ownership of a cache line and complete the naked CL WR operations.

Lower level caches each have a respective cache controller 620, 622. When data are sourced directly from a location other than distributed main memory 605, 607, e.g., lower level cache 619, the associated controller for that cache (cache controller 620) controls the transfer of data from that cache 619 in the same manner as memory controller 606, 608.

Memory Cache Controller Response to Naked Write Operation

With memory subsystems that include upper and lower level caches in addition to the memory, coherent data for both the source and destination addresses may be shared among the caches and coherent data for either address may be present in one of the caches rather than in the memory. That is, the memory subsystem operates as a fully associative memory subsystem. With the source address, the data is always sourced from the most coherent memory location. With the destination address, however, the coherency operation changes from the standard MESI protocol, as described below.

When a memory controller of the destination memory location receives the naked write operations, the memory controller responds to each of the naked writes with one of three main snoop responses. The individual responses of the various naked writes are forwarded to the memory cloner. The three main snoop responses include:

1. Retry response, which indicates that memory cache has the data in the M state but cannot go to I state and/or the memory controller cannot presently accept the WR request/ allocate the buffer to the WR request;

2. Null Response, which indicates that the memory controller can accept the WR request and the coherency state for all corresponding cache lines immediately goes to I state; and 3. Ack_Resend Response, which indicates that the coherency state of the CL within the memory cache has transitioned from the M to the I state but the memory controller is not yet unable to accept the WR request (i.e., memory controller is not yet able to allocate a buffer for receiving the data being moved).

The latter response (Ack_Resend) is a combined response that causes the memory cloner to begin protecting the CL data (i.e., send retries to other components requesting access to the cache line). Modified data are lost from the cache line because the cache line is placed in the I state, as described below. The memory controller later allocates the address buffer within memory cache, which is reserved until the appropriate read operation completes.

Cache Line Invalidation and Memory Cloner Protection of Line

According to the illustrative embodiment, a naked write operation invalidates all corresponding cache lines in the fully associative memory subsystem. Specifically, whenever a memory cloner issues a naked WR targeting a modified cache line of the memory cache (i.e., the cache line is in the M state of MESI or other similar coherency protocol), the memory controller updates the coherency state of the cache line to the Invalid (I) state in response to snooping the naked write.

Also, the naked WR does not cause a "retry/push" operation by the memory cache. Thus, unlike standard coherency operations, modified data are not pushed out of the memory cache to memory when a naked write operation is received at the memory cache. The naked write immediately makes current modified data invalid. After the actual move operation, the new cache line of cloned data is assigned an M coherency state and is then utilized to source data in response to subsequent request for the data at the corresponding address space according to the standard coherency operations.

When the cache line is invalidated, the memory cloner initiates protection of the cache line and takes on the role of a Modified snooper. That is, the memory cloner is responsible for completing all coherency protections of the cache line as if the cache line is in the M state. For example, as indicated at block 511 of FIG. 5A, if the data is needed by another process before the clone operation is actually completed (e.g., a read of data stored at $A_0$ is snooped), the memory controller either retries or delays sending the data until the physical move of data is actually completed. Thus, snooped requests for the cache line from other components are retried until the data has been cloned and the cache line state changed back to M.

Figure 8A:
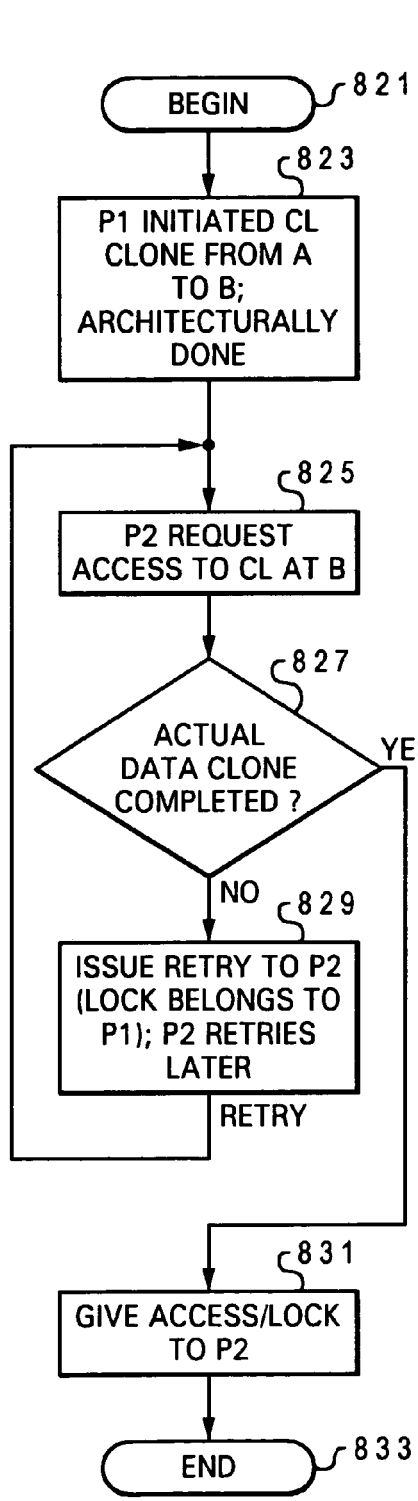
FIG. 8A is a flow chart illustrating a process of lock contention within a data processing system that operates according to one embodiment of the present invention.
Figure 8B:
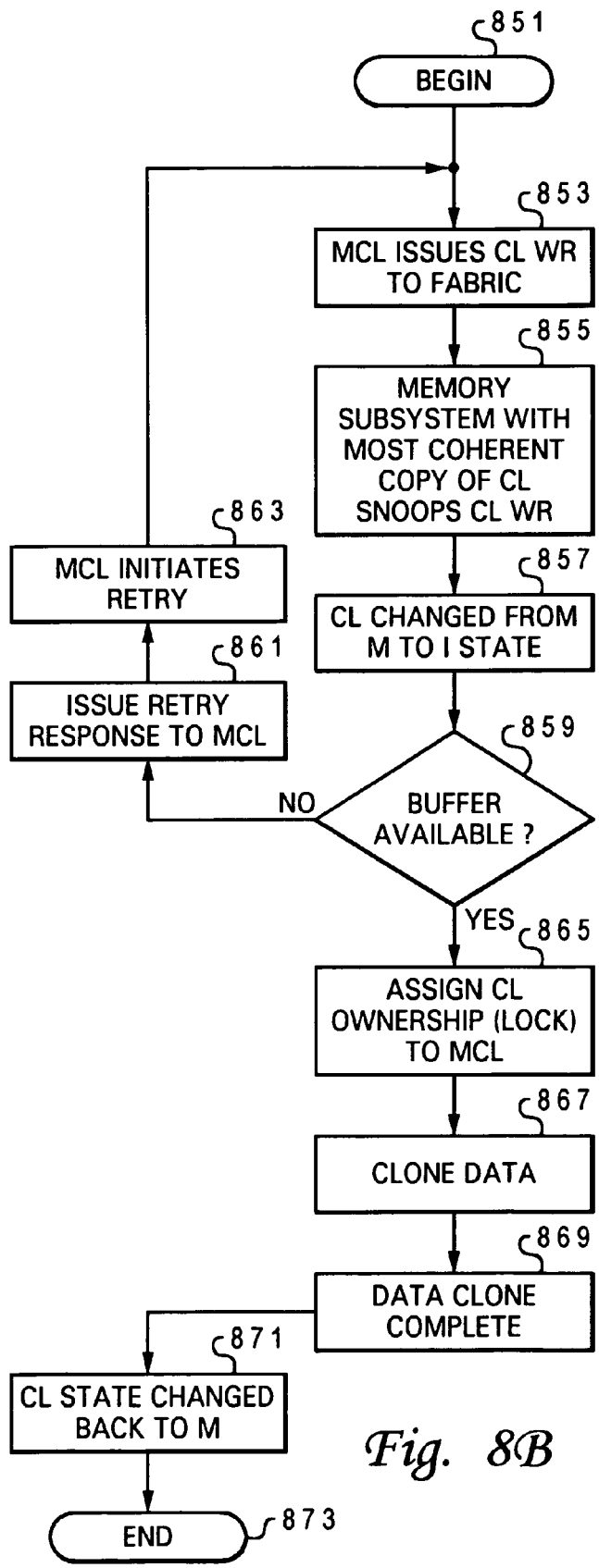
FIG. 8B is a flow chart illustrating a process of maintaining data coherency during a data clone operation according to one embodiment of the present invention.

FIG. 8B illustrates a process by which the coherency operation is completed for a memory clone operation according to one embodiment of the invention. The process begins at block 851, following which, as shown at block 853, memory cloner issues a naked CL WR. In the illustrative process, all snoopers snoop the naked CL WR as shown at block 855. The snooper with the highest coherency state (in this case the memory cache) then changes the cache line state from Modified (M) to Invalid (I) as indicated at block 857.

Notably, unlike conventional coherency protocol operations, the snooper does not initiate a push of the data to memory before the data are invalidated. The associated memory controller signals the memory cloner that the memory cloner needs to provide protection for the cache line. Accordingly, when the memory cloner is given the task of protecting the cache line, the cache line is immediately tagged with the I state. With the cache line in the I state, the memory cloner thus takes over full responsibility for the protection of the cache line from snoops, etc.

Returning to FIG. 8B, a determination is then made at block 859 (by the destination memory controller) whether the buffer for the cache line is available. If the buffer is not available then a Retry snoop response is issued as shown at block 861. The memory cloner then re-sends the naked CL WR as shown at block 863. If, however, the buffer is available, the memory controller assigns the buffer to the snooped naked CL WR as shown at block 865.

Then, the data clone process begins as shown at block 867. When the data clone process completes as indicated at block 869, the coherency state of the cache line holding the cloned data is changed to M as shown at block 871. Then, the process ends as indicated at block 873. In one implementation, the destination memory controller (MC) may not have the address buffer available for the naked CL WR and issues an Ack_Resend response that causes the naked CL WR to be resent later until the MC can accept the naked CL WR and allocate the corresponding buffer.

Livelock Avoidance

A novel method of avoiding livelock is provided. This method involves the invalidating of modified cache lines while naked WRs are in flight to avoid livelocks.

FIG. 8A illustrates the process of handling lock contention when naked writes and then a physical move of data are being completed according to the invention. The process begins at block 821 and then proceeds to block 823, which indicates processor P1 requesting a cache line move from location A to B. P1 and/or the process initiated by P1 acquires a lock on the memory location before the naked WR and physical move of data from the source. Processor P2 then requests access to the cache line at the destination or source address as shown at block 825.

A determination is made (by the destination memory controller) at block 827 whether the actual move has been completed (i.e., P1 may release lock). If the actual move has been completed, P2 is provided access to the memory location and may then acquire a lock as shown at block 831, and then the process ends as shown at block 833. If, however, the move is still in progress, one of two paths is provided depending on the embodiment being implemented. In the first embodiment, illustrated at block 829, a Retry response is returned to the P2 request until P1 relinquishes the lock on the cache line.

In the other embodiment, data is provided from location A if the actual move has not yet begun and the request is for a read of data from location A. This enables multiple processes to source data from the same source location rather than issuing a Retry. Notably, however, requests for access to the destination address while the data is being moved is always retried until the data has completed the move.

I. Multiple Concurrent Data Moves and Tag Identifier

Multiple Memory Cloners and Overlapping Clone Operations

One key benefit to the method of completing naked writes and assigning tags to CL RD requests is that multiple clone operations can be implemented on the system via a large number of memory cloners. The invention thus allows multiple, independent memory cloners, each of which may perform a data clone operation that overlaps with another data clone operation of another memory cloner on the fabric. Notably, the operation of the memory cloners without requiring locks (or lock acquisition) enables these multiple memory cloners to issue concurrent clone operations.

In the illustrative embodiment, only a single memory cloner is provided per chip resulting in completion of only one clone operation at a time from each chip. In an alternative embodiment in which multiple processor chips share a single memory cloner, the memory cloner includes arbitration logic for determining which processor is provided access at a given time. Arbitration logic may be replaced by a FIFO queue, capable of holding multiple memory move operations for completion in the order received from the processors. Alternate embodiments may provide an increased granularity of memory cloners per processor chip and enable multiple memory clone operations per chip, where each clone operation is controlled by a separate memory cloner.

The invention allows multiple memory cloners to operate simultaneously. The memory cloners communicate with each other via the token operations, and each memory cloner informs the other memory cloners of the source and destination address of its clone operation. If the destination of a first memory cloner is the same address as the source address of a second memory cloner already conducting a data clone operation, the first memory cloner delays the clone operation until the second memory cloner completes its actual data move.

Identifying Multiple Clone Operations via Destination ID and Additional Tags

In addition to enabling a direct source-to-destination clone operation, the destination ID tag is also utilized to uniquely identify a data tenure on the fabric when data from multiple clone operations are overlapping or being concurrently completed. Since only data from a single clone operation may be sent to any of the destination memory addresses at a time, each destination ID is necessarily unique.

In another implementation, an additional set of bits is appended to the data routing sections of the data tags 701 of FIG. 7A. These bits (or clone ID tag)703 uniquely identify data from a specific clone operation and/or identify the memory cloner associated with the clone operation. Accordingly, the actual number of additional bits is based on the specific implementation desired by the system designer. For example, in the simplest implementation with only two memory cloners, a single bit may be utilized to distinguish data of a first clone operation (affiliated with a first memory cloner) from data of a second clone operation (affiliated with a second memory cloner).

As will be obvious, when only a small number of bits are utilized for identification of the different data routing operations, the clone ID tag 703 severely restricts the number of concurrent clone operations that may occur if each tag utilized is unique.

Combination of Destination ID and Clone ID Tag

Another way of uniquely identifying the different clone operations/data is by utilizing a combination of the destination ID and the clone ID tag. With this implementation, since the destination ID for a particular clone operation cannot be the same as the destination ID for another pending clone operation (due to coherency and lock contention issues described below), the size of the clone ID tag may be relatively small.

As illustrated in FIG. 7A, the tags are associated (linked, appended, or otherwise) to the individual data clone operations. Thus, if a first data clone operation involves movement of 12 individual cache lines of data from a page, each of the 12 data clone operations are provided the same tag. A second, concurrent clone operation involving movement of 20 segments of data, for example, also has each data move operation tagged with a second tag, which is different from the tag of the first clone operation, and so on.

Re-Usable Tag Identifiers

The individual cache line addresses utilized by the memory cloner are determined by the first 5 bits of the 12 reserve bits within the address field. Since there are 12 reserve bits, a smaller or larger number of addresses are possible. In one embodiment, the other reserved bits are utilized to provide tags. Thus, although the invention is described with reference to separate clone tag identifiers, the features described may be easily provided by the lower order reserve bits of the address field, with the higher order bits assigned to the destination ID.

In one embodiment, in order to facilitate a large number of memory clone operations (e.g., in a large scale multiprocessor system), the clone ID tags 703 are re-used once the previous data are no longer being routed on the fabric. In one embodiment, tag re-use is accomplished by making the tag large enough that it encompasses the largest interval a data move may take.

In the illustrative embodiment, the tags are designed as a re-useable sequence of bits, and smallest number of bits required to avoid any tag collisions during tag use and re-use is selected (i.e., determined as a design parameter). The determination involves a consideration of the number of processors, probable number of overlapping clone operations, and the length of time for a clone operation to be completed. The tags may be assigned sequentially, and, when the last tag in the sequence is assigned, the first tag should be free to be assigned to the next clone operation issued. Thus, a process of tag retirement and re-use is implemented on a system level so that the tag numbering may restart once the first issued tag is retired (i.e., the associated data clone operation completes).

An alternate embodiment provides a clone ID tag comprising as many bits as is necessary to cover the largest possible number of concurrent clone operations, with every clone operation or memory cloner assigned a unique number. For either embodiment, no overlap of clone ID tags occurs.

Several possible approaches to ensure tag deallocation, including when to reuse tags may be employed. In one embodiment, a confirmation is required to ensure that the tags are deallocated and may be re-used. Confirmation of the deallocation is received by the memory cloner from the destination memory controller once a data clone operation completes.

Retry for Tag-based Collisions

One embodiment introduces the concept of a retry for tag-based collisions. According to this embodiment, the tags are re-usable and do not have to be unique. Thus, a first clone operation with tag "001" may still be completing when a subsequent clone operation is assigned that tag number. When this occurs, a first memory cloner that owns a first clone operation snoops (or receives a signaled about) the assignment of the tag to the subsequent clone operation. The first memory cloner then immediately issues a tag-based retry to naked write operations of a second memory cloner that owns the subsequent clone operation. The subsequent clone operation is delayed by the next memory cloner until the first clone operation is completed (i.e., the data have been moved).

J. Architected Bit and ST Clone Operation

Most current processors operate with external interrupts that hold up execution of instructions on the fabric. The external interrupt feature is provided by a hardware bit, that is set by the operating system (OS). The OS sets the processor operating state with the interrupt bit asserted or de-asserted. When asserted, the interrupt can occur at any time during execution of instruction stream and neither the processor nor the application has any control on when an interrupt occurs.

The lack of control over the external interrupts is a consideration during move operations on the external fabric. Specifically, the move operation involves the processor issuing a sequence of instructions (for example, 6 sequential instructions). In order for the move operation to complete without an interrupt occurring during execution of the sequence of instructions, the processor must first secure a lock on the fabric before issuing the sequence of instruction that perform the move operation. This means that only one processor may execute a move operation at a time because the lock can only be given to one requesting processor.

According to one embodiment of the invention, the features that enable the assertion and de-assertion of the external interrupt (EE) bit are modified to allow the interrupt bit to be asserted and de-asserted by software executing on the processor. That is, an application is coded with special instructions that can toggle the external interrupt (EE) bit to allow the processor to issue particular sequences of instructions without the sequence of instructions being subjected to an interrupt.

De-asserting the EE bit eliminates the need for a processor to secure a lock on the external fabric before issuing the sequence of instructions. As a result, multiple processors are thus able to issue their individual sequence of instructions concurrently. As applied to the data clone operation, this feature allows multiple processors in a multiprocessor system to concurrently execute clone operations without having to each acquire a lock. This further enables each processor to begin a data clone whenever the processor needs to complete a data clone operation. Further, as described below, the issuing of instructions without interrupts allows the memory cloner to issue a sequence of instructions in a pipelined fashion.

In the illustrative embodiment, an architected EE (external interrupt) bit is utilized to dynamically switch the processor's operating state to include an interrupt or to not include an interrupt. The sequence of instructions that together constitutes a clone operation are executed on the fabric without interrupts between these instructions. Program code within the application toggles the EE bit to dynamically disable and enable the external interrupts. The OS selected interrupt state is over-ridden by the application software for the particular sequence of instructions. According to the illustrative embodiment, the EE bit may be set to a 1 or 0 by the application running on the processor, where each value corresponds to a specific interrupt state depending on the design of the processor and the software coded values associated with the EE bit.

The invention thus provides a software programming model that enables issuance of multiple instructions when the external interrupts are disabled. With the illustrative embodiment, the sequence of instructions that together complete a move or clone operation are preceded by an instruction to de-assert the EE bit as shown by the following example code sequence:

EE bit=0
ST A
ST B
ST CNT
EE bit=1
SYNC

In the above illustrative embodiment, when the EE bit has a value of 0, the external interrupts are turned off. The instructions are pipelined from the processor to the memory cloner. Then, the value of the EE bit is changed to 1, indicating that the processor state returns to an interrupt enabled state that permits external interrupts. Thereafter, the SYNC operation is issued on the fabric.

ST CLONE Operation

In one embodiment, the memory cloner (or processor) recognizes the above sequence of instructions as representing a clone operation and automatically sets the EE bit to prevent external interrupts from interrupting the sequence of instructions. In an alternative embodiment, the above sequence of instructions is received by the memory cloner as a combined, atomic storage operation. The combined operation is referred to herein as a Store (ST) CLONE and replaces the above sequence of three separate store operations and a SYNC operation with a single ST CLONE operation.

ST CLONE is a multi-byte storage operation that causes the memory cloner to initiate a clone operation. Setting the EE bit enables memory cloner to replace the above sequence of store instructions followed by a SYNC with the ST CLONE operation.

Thus, the 4 individual operations (i.e., the 3 stores followed by a SYNC) can be replaced with a single ST CLONE operation. Also, according to this implementation of the present invention, the SYNC operation is virtual, since the processor is signaled of a completion of the data clone operation once the architecturally DONE state is detected by the memory cloner. The architecturally done state causes the processor to behave as if an issued SYNC has received an ACK response following a memory clone operation.

K. Virtual/Real Address Operating Mode via Reserve Bit

Figure 9A:
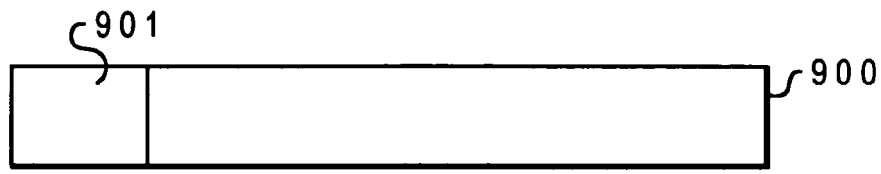
FIG. 9A illustrates an instruction with an appended mode bit that may be toggled by software to indicate whether processor execution of the instruction occurs in real or virtual addressing mode according to one embodiment of the invention.

The invention enables an application-based, dynamic selection of either virtual or real addressing capability for a processing unit. Within each instruction that may affect the location of data in memory (e.g., a ST instruction), a reserve bit is provided that may be set by the software application (i.e., not the OS) to select the operating mode of the processor as either a virtual addressing or real addressing mode. FIG. 9A illustrates an address operation 900 with a reserve bit 901. The reserve bit 901 is capable of being dynamically set by the software application running on the processor. The processor operating mode changes from virtual-to-real and vice versa, depending on the code provided by the application program being run on the processor.

The reserve bit 901 indicates whether real or virtual addressing is desired, and the reserve bit is assigned a value (1 or 0) by the software application executing on the processor. A default value of "0" may be utilized to indicate virtual addressing, and the software may dynamically change the value to "1" when real addressing mode is required. The processor reads the value of the reserve bit to determine which operating mode is required for the particular address operation.

The selection of virtual or real addressing mode may be determined by the particular application process that is being executed by the processor. When the application process requires seeks increased performance rather than protection of data, the virtual operating mode is selected, allowing the application processes to send the effective addresses directly to the OS and firmware.

Figure 9B:
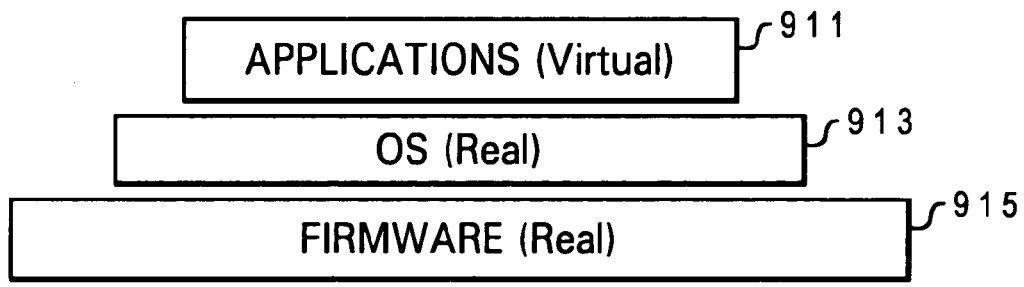
FIG. 9B illustrates the application code, OS, and firmware layers within a data processing system and the associated type of address operation supported by each layer according to one embodiment of the invention.

FIG. 9B illustrates a software layers diagram of a typical software environment and the associated default operating mode for address operations. As illustrated, software applications 911 operate in a virtual addressing mode, while OS 913 and firmware 913 operate in a real addressing mode. Selection of the mode that provides increased performance is accomplished by setting the reserve bit to the pre-established value for virtual addressing mode. Likewise, when data protection is desired, the reserve bit is set to the value indicating virtual addressing mode, and the virtual data address is sent to memory cloner 211, where TLB 319 later provides a corresponding real address. The invention thus enables software-directed balancing of performance versus data protection.

Processor operations in a virtual address mode are supported by the virtual-to-real address translation look-aside buffer (TLB) of memory cloner 211. The TLB is utilized to translate addresses from virtual to real (or physical address) when the memory cloner operations are received with virtual addresses from the processor. Then, the virtual addresses are translated to real addresses prior to being issued out on the fabric. From the OS perspective, the virtual addressing mode enables user level privileges, while the real addressing mode does not. Thus, the virtual addressing mode enables data to be accessed by the user level applications and by the OS. Also, the virtual addressing mode allows both the operating system (OS) and the user level applications to access the memory cloner. The real address operating mode enables quicker performance because there is no need for an address translation once the instruction is issued from the processor.

L. Additional Features, Overview, and Benefits

Data that are the target of data move operation are sourced from the most coherent memory location from among actual memory, processor caches, lower level caches, intervening caches, etc. Thus, the source address also indicates the correct memory module within the memory subsystem that contains the coherent copy of the requested data.

The invention enables multiple clone operations to overlap (or be carried out concurrently) on the fabric. To monitor and uniquely distinguish completion of each separate clone operation, a tag is provided that is appended to the address tag of the read operation sent to the source address. The tag may be stored in an M bit register, where each clone operation has a different value placed in the register, and M is a design parameter selected to support the maximum number of possible concurrent clone operations on the system.

As described above, once the naked WR process is completed, the move is architecturally done. The implementation of the architecturally DONE state and other related features releases the processors from a data move operation relatively quickly. All of the physical movement of data, which represents a substantial part of the latencies involved in a memory move, occurs in the background. The processor is able to resume processing the instructions that follow the SYNC in the instruction sequence rather quickly since no data transmission phase is included in the naked write process that generates the architecturally done state.

Notably, where the data moves between addresses on the same memory module, the time benefits are even more pronounced as the data do not have to be transmitted on the external switch fabric. Such "internal" memory moves are facilitated with the upper layers of metal on the memory chip that interconnect the various sub-components of the memory module (e.g., controller, etc.). Such a configuration of the memory module is provide at FIG. 6C. Thus in the switch implementation in which there are interconnects running between the various modules, direct internal data cloning is also possible via the upper layer metals 651 of the memory module 605.

The invention provides several other identifiable benefits, including: (1) the moved data does not roll the caches (L2, L3, etc.) like traditional processor initiated moves; and (2) due to the architecturally DONE processor state, the executing software application also completes extremely quickly. For example, in the prior art, a 128B CL move (LD/ST) is carried out as: LD/ST: 1 CL RDx (address and data), 32 CL RDy (address and data), 32 CL WRy (address and data). This operation is effectively 3 address operations and 384 bytes of data transactions. With the present invention, however, the same process is completed with 1 naked CL WRy (address only) and 1 CL RDx (address only) bus transactions. Thus, a significant performance gain is achieved.

The invention exploits several currently available features/operations of a switch-based, multiprocessor system with a distributed memory configuration to provide greater efficiency in the movement of data from the processing standpoint. For example, traditionally MCs control the actual sending and receiving of data from memory (cache lines) to/from the processor. The MCs are provided an address and a source ID and forward the requested data utilizing these two parameters. By replacing a source ID with a destination ID in the address tag associated with a cache line read, the invention enables direct MC-to-MC transmission (i.e., sending and receiving) of data being moved without requiring changes to the traditional MC logic and/or functionality.

The switch also enables multiple memory clone operations to occur simultaneously, which further results in the efficient utilization of memory queues/buffers. With the direct switch connections, the time involved in the movement of data is also not distance or count dependent for the volume of memory clone operations.

The invention improves upon the hardware-based move operations of current processors with an accelerator engine by virtualization of hardware and inclusion of several software-controlled features. That is, the performance benefit of the hardware model is observed and improved upon without actually utilizing the hardware components traditionally assigned to complete the move operation.

Another example involves utilizing the switch to enable faster data movement on the fabric since the cache lines being moved no longer have to go through a single point (i.e., into and out of the single processor chip, which traditionally receives and then sends all data being moved). Also, since the actual data moves do not require transmission to the single collecting point, a switch is utilized to enable the parallel movement of (multiple) cache lines, which results in access to a higher bandwidth and subsequently a much faster completion of all physical moves. Prior systems enable completion of only a single move at a time.

The invention further enables movement of bytes, cache lines and pages. Although no actual time is provided for when the move actually occurs, this information is tracked by the memory cloner, and the coherency of the processing system is maintained. Processor resources are free to complete additional tasks rather than wait until data are moved from one memory location to another, particularly since this move may not affect any other processes implemented while the actual move is being completed.

Although the invention has been described with reference to specific embodiments, this description should not be construed in a limiting sense. Various modifications of the disclosed embodiments, as well as alternative embodiments of the invention, will become apparent to persons skilled in the art upon reference to the description of the invention. It is therefore contemplated that such modifications can be made without departing from the spirit or scope of the present invention as defined in the appended claims.

What is claimed is:

1. A processing unit comprising:
   a processor;
   operating means for dynamically toggling an interrupt mode of said processing unit between enabled and disabled to allow said processor to issue a sequence of instructions that complete a move operation of data from a first memory location to a second memory location without being subject to an external interrupt;
   wherein said operating means replaces said sequence of instructions with a single combined operation, in response to a determination that said sequence of instructions completes a move operation and said sequence of instructions follows a de-assertion of said external interrupt; and
   wherein said processing unit completes said move operation from one memory location in a main memory to another memory location with no lock acquisition phase at the processor and without having the data travel to the processor from the first memory location, responsive to said single combined operation.

2. The processing unit of claim 1, wherein said operating means includes an architected bit that can be toggled between an on and off state by software executing on said processor, wherein said on state enables external interrupts of issued processor instructions and said off state disables said external interrupts.

3. The processing unit of claim 2, wherein said operating means includes:
   means for determining when said processor is to issue said sequence of instructions that complete a data move operation, wherein said means for determining includes:
      means for recognizing a sequence of instructions that together complete a data move operation; and
      means for issuing said sequence of instructions as a single block operation that completes without external interrupts;
   means for toggling said architected bit to an off state prior to issuing said sequence of instructions; and
   means for subsequently toggling said architected bit to said on state after execution of said sequence of instructions.

4. The processing unit of claim 1, wherein said single combined operation is a Store (ST) CLONE operation, said operating means further includes means for issuing said ST CLONE operation in place of said sequence of instructions, wherein the data move operation is completed independent of the processor, such that no data being moved is sent to the processor during the move.

5. The processing unit of claim 1, further comprising a memory cloner that completes the data move operation such that the processor does not receive the data of the first memory location during the data move operation, said memory cloner comprising logic and registers for receiving address-only instructions to execute the data move operation.

6. A method for enabling dynamic, software selection of an interrupt mode of a data processing system that includes one or more processors that issue instructions on an external fabric of said data processing system, said method comprising:
   de-asserting an external interrupt (EE) bit that controls whether interrupts may occur;
   wherein said de-asserting step occurs in response to a recognition by a processor among said one or more processors of a sequence of instructions as instructions that complete a data move operation on the fabric, wherein said instructions are then executed without external interrupts and wherein a need for the processor to secure a lock before completing the move operation is eliminated, and wherein further multiple processors are able to concurrently issue respective sequences of instructions;
   subsequently issuing instructions to the fabric and executing said instructions without external interrupts;
   combining said sequence of instructions into a single Store (ST) CLONE operation, wherein said ST CLONE operation is a combined instruction that initiates a data clone operation to move data from a source address corresponding to a location within a main memory to a destination address without returning data to the processor when the ST CLONE operation is placed on the fabric; and
   in response to receiving a software indication to enable subsequent external interrupts,
      asserting the EE bit; and
      subsequently issuing instructions to the fabric for execution subject to the subsequent external interrupts.

7. The method of claim 6, wherein said de-asserting step occurs in response to receiving a software indication to disable an external interrupt for executing instructions on the external fabric.

8. A multiprocessor data processing system, comprising:
   a plurality of processor chips, each having a processor;
   a main memory coupled to said plurality of processor chips; and
   wherein at least one processor includes means for:
      de-asserting an external interrupt (EE) bit that controls whether interrupts may occur;
      subsequently issuing instructions to the fabric and executing said instructions without external interrupts;
      issuing a sequence of individual instructions as a single combined operation for concurrent completion without external interrupts;
      generating and issuing a single Store (ST) CLONE operation as the single combined operation that provides the functionality of the sequence of individual instructions required for completing a data clone operation requested by the processor wherein the data clone operation moves data from a first location in the main memory to a second location without returning data to the processor; and
      in response to receiving a software indication to enable subsequent external interrupts,
         asserting the EE bit; and
         subsequently issuing instructions to the fabric for execution subject to the subsequent external interrupts.

9. The data processing system of claim 8, further comprising a software-provided architected bit that dynamically changes the external interrupt mode of the system and which is set to provide an enabled and disabled state by application code running on a processor, wherein said enabled state provides subsequent processor operations with interrupts and said disabled state provides processor operations without interrupts.

10. The data processing system of claim 9, wherein said means for issuing a sequence of instructions includes:
   means for determining when said processor is to execute a sequence of instructions without an external interrupt;
   means for toggling said architected bit to a disabled state when said sequence of instructions without an external interrupt is to be completed;
   means for executing said sequence of instructions without said interrupt; and means for subsequently toggling said architected bit to said enabled state.

11. The data processing system of claim 10, wherein said means for determining includes:
- means for recognizing a sequence of processor-issued instructions that together complete a data move operation; and
- means for issuing said sequence of operations as a single block of operations without interrupts.

12. The data processing system of claim 8, wherein said at least one processor further includes means for replacing said sequence of instructions with a single ST CLONE operation, wherein said ST CLONE operation initiates a data clone operation from a source address to a destination address without returning data to the processor when the ST CLONE operation is placed on the fabric.

13. The data processing system of claim 8, wherein said at least one processor further comprises a memory cloner, which completes the data move operation such that the processor does not receive the data of the first memory location during the data move operation, said memory cloner comprising logic and registers for receiving address-only instructions to execute the data move operation.

14. A multiprocessor data processing system comprising:
- a first processor chip with a first processor;
- a second processor chip with a second processor;
- a memory subsystem having a main memory interconnected to both said first and said second processor chip;
- a fabric that interconnects said memory subsystem and said first and said second processor;
- wherein a standard operating mode of said first and said second processors includes acquiring a lock on the fabric prior to executing a sequence of instructions that when placed on the fabric implements a data clone operation; and
- wherein said first processor and said second processor concurrently complete data clone operations to move data from one memory location in the main memory to another memory location without sending the data to the processor by disabling an interrupt mode and executing said sequence of instructions without first acquiring a lock on the fabric.

15. The data processing system of claim 14, wherein said disabling an interrupt mode includes:
- means for dynamically switching off an external interrupt bit of said system via a software-issued architected bit that is set to off prior to said sequence of instructions; and
- means for dynamically switching on said external interrupt bit following execution of said sequence of instructions.

* * * * *